US010263988B2

(12) United States Patent
Vij et al.

(10) Patent No.: US 10,263,988 B2
(45) Date of Patent: Apr. 16, 2019

(54) PROTECTED CONTAINER KEY MANAGEMENT PROCESSORS, METHODS, SYSTEMS, AND INSTRUCTIONS

(71) Applicant: Intel Corporation, Santa Clara, CA (US)

(72) Inventors: Mona Vij, Hillsboro, OR (US); Somnath Chakrabarti, Bangalore (IN); Carlos V. Rozas, Portland, OR (US); Asit K. Mallick, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/201,447

(22) Filed: Jul. 2, 2016

(65) Prior Publication Data

US 2018/0007051 A1  Jan. 4, 2018

(51) Int. Cl.
*H04L 29/06* (2006.01)
*G06F 21/10* (2013.01)
*G06F 21/62* (2013.01)

(52) U.S. Cl.
CPC .............. *H04L 63/10* (2013.01); *G06F 21/10* (2013.01); *G06F 21/6245* (2013.01); *H04L 63/06* (2013.01); *H04L 63/08* (2013.01)

(58) Field of Classification Search
CPC ...................................................... H04L 63/10
USPC ............................................................ 726/4
See application file for complete search history.

(56) References Cited

U.S. PATENT DOCUMENTS

| 8,566,342 | B2 | 10/2013 | Aluf-Medina |
| 9,710,401 | B2* | 7/2017 | Rozas ................. G06F 12/1408 |
| 2003/0021417 | A1* | 1/2003 | Vasic ................ G06F 17/30067 380/277 |
| 2016/0173281 | A1 | 6/2016 | White et al. |

OTHER PUBLICATIONS

Rozas et al., "Instructions and logic to Suspend/Resume Migration of Enclaves in a Secure Enclave Page Cache", U.S. Appl. No. 14/998,157, filed Dec. 24, 2015, 97 pages.
Rozas et al., "Platform Migration of Secure Enclaves", U.S. Appl. No. 14/829,340, filed Aug. 18, 2015, 56 pages.
Rozas et al., "Processors, Methods, Systems, and Instructions to Determine Whether to Load Encrypted Copies of Protected Container Pages Into Protected Container Memory", U.S. Appl. No. 15/274,217, filed Sep. 23, 2016, 79 pages.

(Continued)

Primary Examiner — Jacob Lipman
(74) Attorney, Agent, or Firm — NDWE, LLP

(57) ABSTRACT

A processor of an aspect includes a decode unit to decode an instruction. The instruction to indicate a first structure in a protected container memory and to indicate a second structure in the protected container memory. The processor also includes an execution unit coupled with the decode unit. The execution unit, in response to the instruction, is to determine whether a status indicator is configured to allow at least one key to be exchanged between the first and second structures, and is to exchange the at least one key between the first and second structures when the status indicator is configured to allow the at least one key to be exchanged between the first and second structures.

25 Claims, 14 Drawing Sheets

(56) References Cited

OTHER PUBLICATIONS

Rozas et al., "Processors, Methods, Systems, and Instructions to Support Live Migration of Protected Containers", U.S. Appl. No. 14/752,227, filed Jun. 26, 2015, 79 pages.
International Preliminary Report on Patentability for Application No. PCT/US2017/036036, dated Jan. 17, 2019, 11 pages.

* cited by examiner

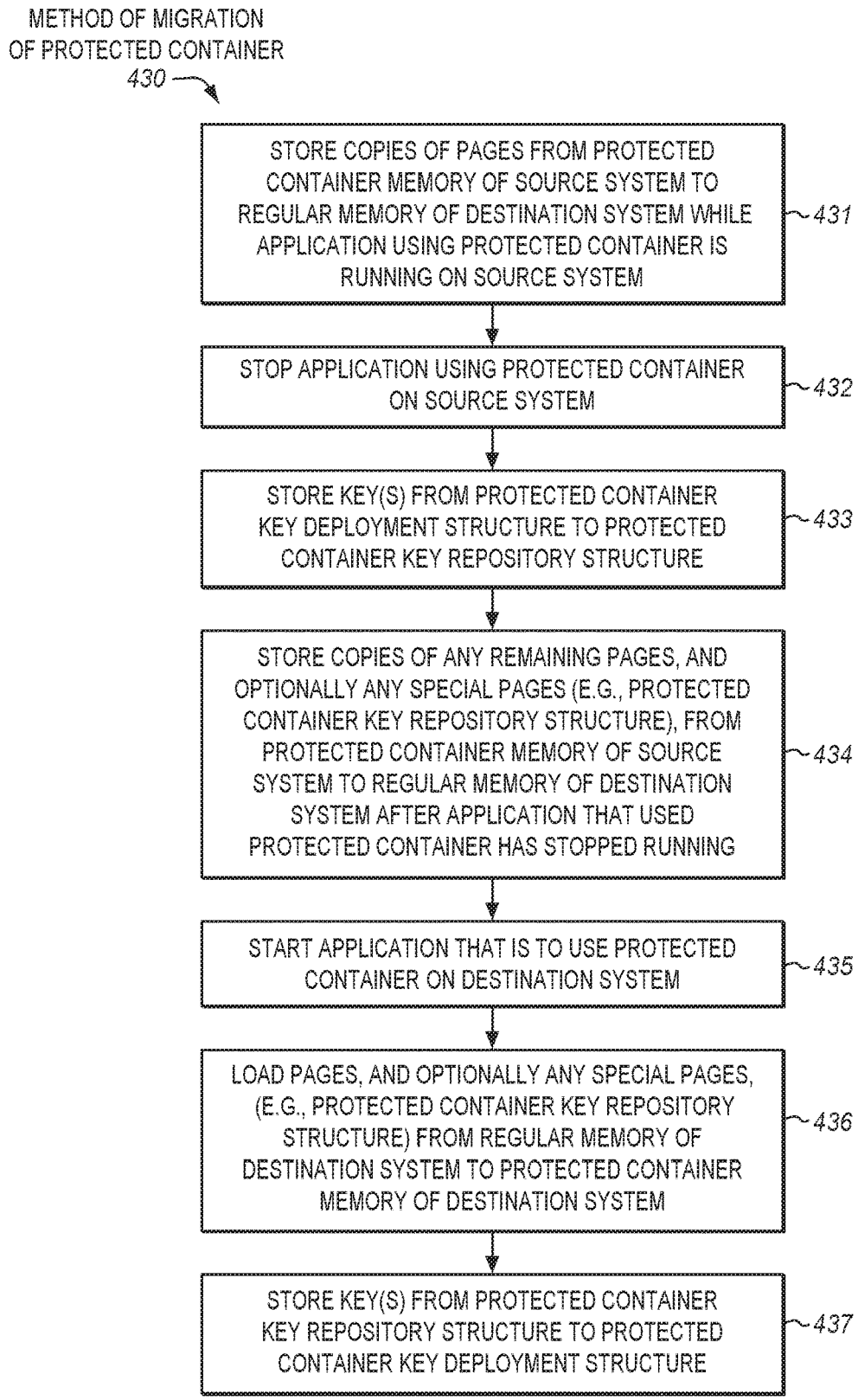

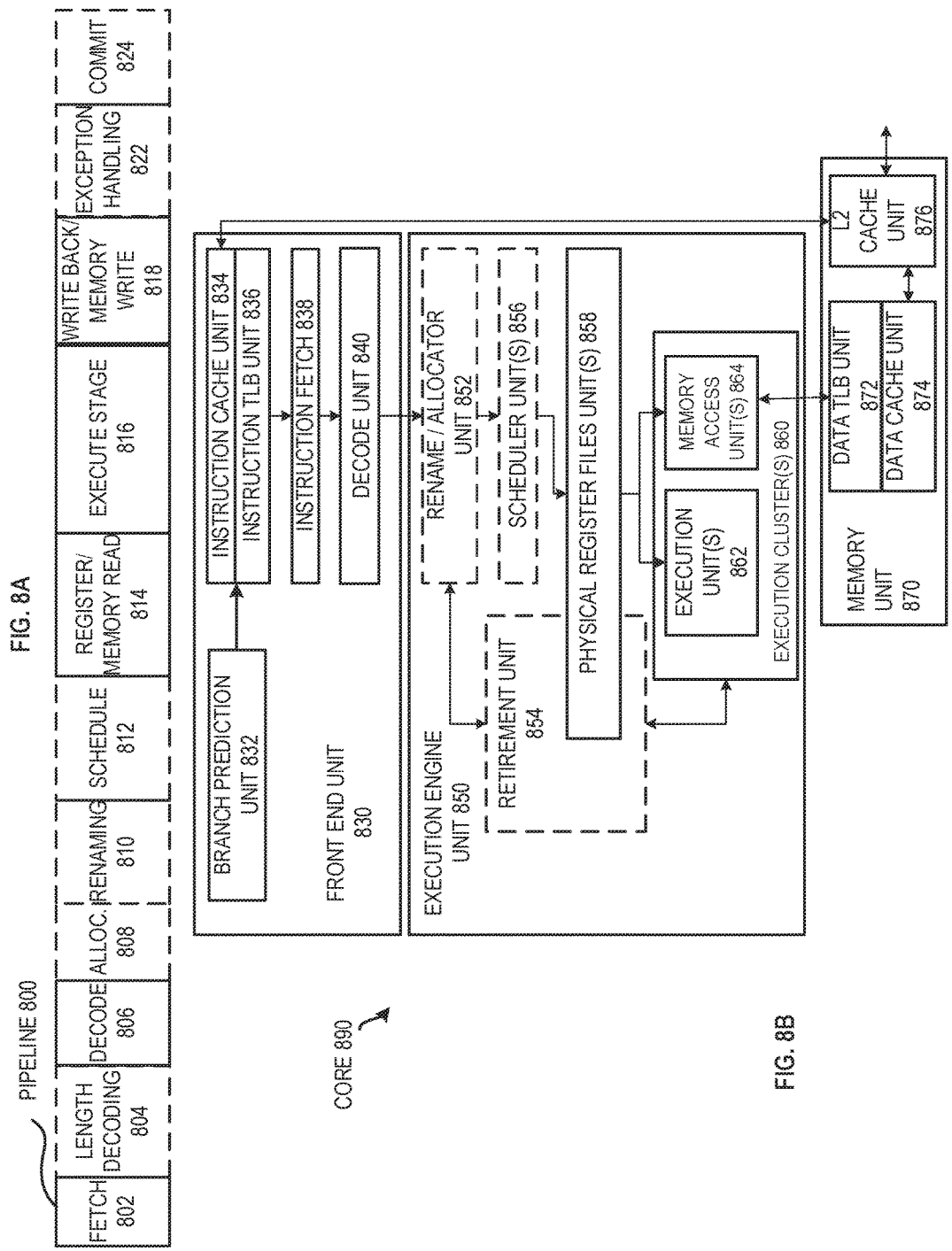

PROTECTED CONTAINER KEY MANAGEMENT PROCESSORS, METHODS, SYSTEMS, AND INSTRUCTIONS

BACKGROUND

Technical Field

Embodiments described herein generally relate to processors. In particular, embodiments described herein generally relate to processors having architectural support for secure enclaves or other protected containers.

Background Information

Desktop computers, laptop computers, smartphones, servers, routers and other network elements, and various other types of computer systems and/or electronic devices are often used to process secret or confidential information. A few representative examples of such secret or confidential information include, but are not limited to, passwords, account information, financial information, information during financial transactions, confidential company data, enterprise rights management information, personal calendars, personal contacts, medical information, other personal information, and the like. It is generally desirable to protect such secret or confidential information from inspection, tampering, and the like.

BRIEF DESCRIPTION OF THE DRAWINGS

The invention may best be understood by referring to the following description and accompanying drawings that are used to illustrate embodiments. In the drawings:

FIG. 4 is a block flow diagram of one example embodiment of a method of migrating a protected container from a source computer system to a destination computer system.

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Disclosed herein are embodiments of protected container key management instructions, embodiments of processors to perform the instructions, embodiments of methods performed by the processors when performing the instructions, embodiments of systems incorporating one or more processors to perform the instructions, and embodiments of programs or machine-readable mediums providing the instructions. In some embodiments, the processors may have a decode unit or other logic to receive and/or decode the instructions, and an execution unit or other logic to perform the instructions. In the following description, numerous specific details are set forth (e.g., specific instruction operations, security checks, sequences of operations, protected container implementation details, processor configurations, microarchitectural details, etc.). However, embodiments may be practiced without these specific details. In other instances, well-known circuits, structures and techniques have not been shown in detail to avoid obscuring the understanding of the description.

Figure 1:
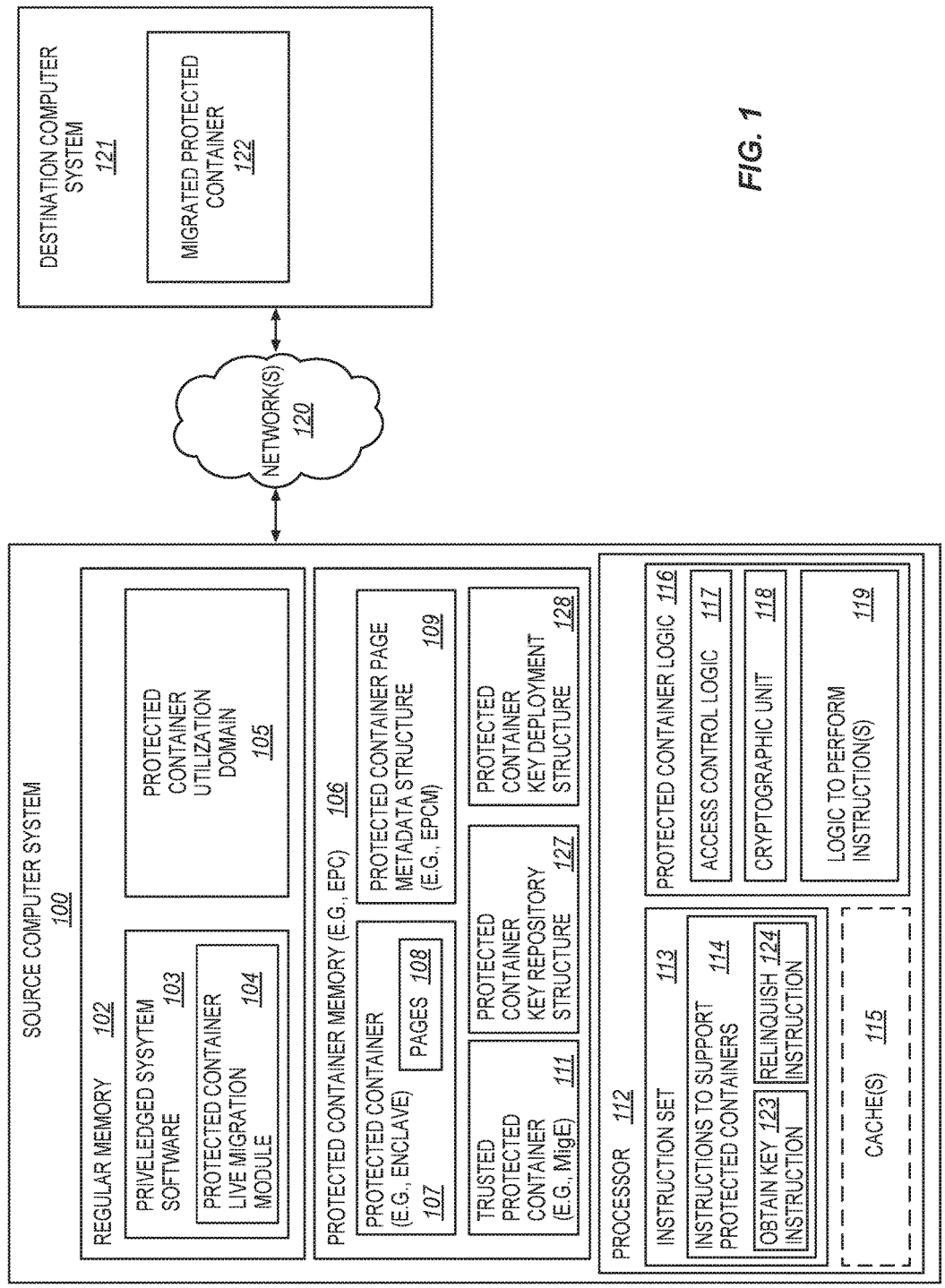
FIG. 1 is a block diagram of a computing environment in which a protected container may be migrated from a source computer system to a destination computer system.

FIG. 1 is a block diagram of a computing environment in which a secure enclave or other protected container 107 may be migrated from a source computer system 100 to a destination computer system 121. The computing environment is suitable for implementing embodiments of instructions and processors disclosed elsewhere herein. However, other embodiments are not limited to this particular computing environment, or to migration of protected containers. The source and destination computer systems may represent desktop computers, laptop computers, servers, network elements, or other types of computer systems. The source and destination computer systems may be coupled by one or more intervening networks 120 (e.g., the Internet, a private network, a virtual private network). Alternatively, the source and destination computer systems may be coupled directly by one or more local wired or wireless links.

The source computer system includes at least one processor 112, a regular memory 102 (e.g., a first portion of system memory), and a protected container memory 106 (e.g., a second portion of system memory). The system memory used to implement the regular and protected container memories may include one or more devices of either the same or different type (e.g., dynamic random access memory (DRAM), flash memory, hard disks, tapes, and combinations thereof).

The regular memory 102 and protected container memory 106 may have different levels of protection and/or security that are controlled or enforced in part by protected container logic 116 of the processor 112. The regular memory may have relatively lower level of protection and/or security suitable for storing regular user-level and system-level applications and data. As shown, the regular memory may store privileged system software 103 (e.g., a virtual machine monitor, one or more operating systems, etc.), and user-level applications (e.g., network management applications, database applications, email applications, spreadsheet applications, etc.).

The protected container memory 106 may have a relatively higher level of protection and/or security than the regular memory 102. Attempted accesses to the protected container memory may be treated with additional protection and/or security that may be enforced, controlled, or otherwise provided, at least in part, by various protected container resources (e.g., protected container logic 116, instructions 114 to support protected containers, certain structures in the protected container memory) In some embodiments, at least some on-die hardware and/or firmware of the processor (e.g., access control logic 117, cryptographic unit 118,) may be used to help provide this protection and/or security. One specific suitable example of the protected container memory is an Intel® Software Guard Extensions (Intel® SGX) enclave page cache (EPC), although the scope of the invention is not so limited.

At least one protected container 107 may be stored in the protected container memory 106. In various embodiments, the protected container may represent a secure enclave, an isolated execution environment, an isolated execution region, a container operative to maintain code and/or data thereof secret even from more privileged system level software, or other types of protected containers. One specific suitable example of the protected container is an Intel® SGX secure enclave, although the scope of the invention is not so limited. One or more pages of a running or operating Intel® SGX enclave may be stored in the protected container memory (e.g., an enclave page cache (EPC)).

The protected container 107 may be created for a protected container utilization domain 105, such as, for example, an application module, a guest application of a virtual machine module, or the like. The protected container utilization domain may store data and/or code in the protected container. As used herein, the code and/or data may be referred to simply as "data" or "contents" of the protected container. Protected container resources (e.g., protected container logic 116, instructions 114 to support protected containers, data structures in the protected container memory 106) may help to keep the contents of the protected container confidential. This may include preventing disclosure of these contents to other entities besides the protected container utilization domain. In some embodiments, these contents may be kept confidential even from the more highly privileged system software 103. In some implementations, the privileged system software may at least help to create and/or manage the protected container, on behalf of the protected container utilization domain, but the protected container may be generally opaque and inaccessible (e.g., not readable and not writeable) to the privileged system software. In some embodiments, the protected container resources may optionally provide one or more additional protections, such as, for example, ensuring integrity of the contents of the protected container (e.g., authenticating or otherwise ensuring the lack of tampering) and/or preventing replay of the protected container.

In some embodiments, a protected container page metadata structure (PCPMS) 109 may be used to store metadata for the protected container 107. As shown, the PCPMS may optionally be stored in the protected container memory, although this is not required (e.g., instead it may optionally be included in an on-die structure). In some embodiments, the PCPMS may represent a data structure to store metadata for each page stored in the protected container memory. Examples of such metadata include, but are not limited to, information to indicate whether the page is valid or invalid, information to indicate a protected container to which the protected container page belongs, information to indicate a virtual address through which the protected container page is allowed to be accessed, information to indicate read/write/execute permissions for the protected container page, and the like. Alternatively, less metadata, additional metadata, or other combinations of metadata may optionally be used in different embodiments. One specific suitable example of the PCPMS, for some embodiments, is an Intel® SGX enclave page cache map (EPCM), although the scope of the invention is not so limited.

Referring again to FIG. 1, the processor 112 may have architectural extensions and microarchitectural logic to help support the protected containers. For example, an instruction set 113 of the processor may include various different types of instructions 114 to support the protected containers. Without limitation, there may optionally be instructions to create a protected container, destroy a protected container, enter a protected container, exit a protected container, manage paging for a protected container, perform security operations on a protected container, and the like. Some of the instructions may be privileged-level instructions that may only be performed by the privileged system software 103, but not by unprivileged user-level software. Other instructions may be unprivileged or user-level instructions.

The processor may have protected container logic 116 to provide support for the protected containers. This protected container logic may include logic to perform the aforementioned instructions. This protected container logic may also include access control logic 117. The access control logic may be operative to control access to the protected container memory 106, as well as contents from the protected container memory when they locally stored or otherwise resident in an unencrypted form in the cache(s) 115, registers, or other structures or components of the processor during runtime. Different types of access control logic are suitable in different embodiments. In some embodiments, the access control logic may include a memory management unit (MMU) and/or a page miss handler (PMH) unit that may be operative to control access to contents of the protected container memory in part by consulting with page tables, range registers, the PCPMS 109, or the like. By way of example, at least one range register of the processor may store at least one range for the protected container memory. In one aspect, a basic input/output system (BIOS) may store the range during boot. In some embodiments, the access control logic may be operative to allow authorized accesses to the contents of a protected container (whether in the protected container memory or resident within the processor) from code of the same protected container, but may prevent unauthorized accesses to these contents (whether in the protected container memory or resident within the processor) from code outside of the protected container (e.g., even from more highly privileged system software 103). One specific suitable example of the access control logic is that found on Intel® SGX enabled processors, although the scope of the invention is not so limited.

The protected container logic 116 may also include a cryptographic unit 118. In some embodiments, the cryptographic unit may automatically encrypt data of protected containers before the data is stored out of the processor (e.g., to system memory), such as, for example, during writes to the regular memory 102. This may help to prevent the data from being viewed (e.g., help to provide for confidentiality of the data). The cryptographic unit may also be operative to decrypt encrypted data of protected container pages when they are received into the processor (e.g., from the protected container memory).

In some embodiments, the cryptographic unit 118 may also optionally be operative to provide cryptographic integrity protection and/or authentication to the data of protected containers. For example, the cryptographic unit may automatically compute a message authentication code, or other authentication or integrity check data, for the data of protected containers before the data is stored out of the processor (e.g., to regular memory). The cryptographic unit may also optionally be operative to use such authentication or integrity check data to authenticate or ensure the integrity of data of protected container pages when they are received into the processor (e.g., from regular memory). Such authentication or integrity checking may help to detect integrity violations of protected container pages and prevent access to changed or tampered data.

In one aspect, such cryptographic operations may be performed automatically and autonomously by the cryptographic unit 118, and transparently to software (e.g., as opposed to software having to perform a software cryptographic algorithm). In some embodiments, the cryptographic unit may optionally selectively perform such cryptographic operations for the data of the protected containers, but not for data of regular pages not belonging to the protected containers.

Referring again to FIG. 1, in some embodiments, the privileged system software 103 of the source computer system 110 may include a protected container live migration module 104. In some embodiments, the protected container live migration module may be part of a virtual machine monitor (VMM). In other embodiments, the protected container live migration module may be part of an operating system. In some embodiments, the source computer system may include a trusted protected container 111. As shown, the trusted protected container may also optionally be stored in the protected container memory. The trusted protected container may represent a trusted entity that is more trusted than and/or may have more privileges than the privileged system software 103 and other protected containers (e.g., the protected container 107). In some embodiments, the trusted protected container may represent a so-called architectural or controlling protected container. In some embodiments, the trusted protected container and/or the architectural or controlling protected container, may be operative to provide a wide class of services (e.g., including protected container migration related services) to multiple protected containers. One specific suitable example of the trusted protected container is an Intel® Software Guard Extensions (Intel® SGX) migration engine (MigE), although the scope of the invention is not so limited. In some embodiments, the protected container live migration module 104 and the trusted protected container 111 may cooperate or work together to perform live migration of protected containers (e.g., the protected container 107) from the source computer system 100 to the destination computer system 121. The term live refers to the fact that the migration may be performed partly while the protected container 107 is running on the source computer system.

As mentioned above, the use of protected containers generally includes using one or more cryptographic keys. Commonly, a root key is used to derive and provision other types of keys. Possible examples of such keys include, but are not limited to, paging keys that may be used to protect pages when paged out or stored out of the protected container memory, keys used for identification, user keys, virtual machine attestation keys, and combinations thereof. Conventionally, the root key, from which such other types of keys may be derived or provisioned, may be fused or otherwise fixedly held inside the processor, and may be unique to the processor. Consequently, deriving or provisioning the other types of keys from the root key generally also binds or fixes these other types of keys to the same processor where the root keys are fused or fixedly held. This poses a challenge for migration of a protected container from a source having one processor with the root keys, to a destination having a processor with a different unique set of root keys. Alternate ways of using keys would be useful and beneficial.

Referring again to FIG. 1, in some embodiments, two different types of pages or other structures may be used to store one or more keys for protected containers. Specifically, in some embodiments, a first protected container key repository structure 127, and a second protected container key deployment structure 128 may be used. In this example, two different structures are shown, although alternatively a same structure may be used and may its properties may be changed. As shown, these structures may optionally be stored in the protected container memory, although this is not required. Examples of suitable structures include, but are not limited to, structured pages of memory, data structures, and the like. In another embodiment, one or more of these structures may optionally represent an on-die structure. In some embodiments, these structures may be used to store at least one key (e.g., a root key from which one or more other keys may be derived or provisioned). Optionally, in some embodiments, these structures may be used to store one or more other types of keys. In some embodiments, the protected container key repository structure may represent a place to store such one or more keys to allow them to be securely migrated from the source computer system to the destination computer system.

Referring again to FIG. 1, in some embodiments, the instruction set 113 may include at least one protected container key management instruction. For example, the instruction set may include at least one of an obtain protected container key instruction 123 and a relinquish protected container key instruction 124. In some embodiments, the instruction set may optionally support only either one of these instructions. In other embodiments, both of these instructions may optionally be supported. Further, in some embodiments, the processor may include logic 119 that is operative to support at least one or optionally both of these two instructions. Each of these instructions when performed may cause at least one key to be exchanged between the protected container key repository structure 127 and the protected container key deployment structure 128, as will be discussed further below, provided that one or more conditions are satisfied. As one possible use, the obtain key instruction 123 and associated logic may be used to deploy or otherwise obtain at least one key from the repository structure 127 to the deployment structure 128, so that the at least one key may be used for one or more protected containers, and the relinquish key instruction 124 may be used to release or relinquish the at least one key from the deployment structure 128 to the repository structure 127. In some embodiments, the at least one key may be returned to the repository structure, and then the repository structure may be migrated with the key from the source computer system to the destination computer system, although the instructions may also optionally be used for other purposes besides just those associated with live migration of protected containers.

After the migration is complete, the destination computer system 121 may have a migrated protected container 122. A simplified version of the destination computer system is shown, although it is to be appreciated that the destination computer system may optionally be similar to or the same as the source computer system.

This is just one illustrative example embodiment of a suitable protected container environment in which embodiments disclosed herein may be implemented. The embodiments disclosed herein may alternatively be implemented in different environments. Specifically, the level of protection and types of protection may vary from one implementation to another depending upon the particular implementation, need for security, and cost versus security tradeoffs. The disclosed embodiments may be used in environments with varying levels and types of protection.

Figure 2:
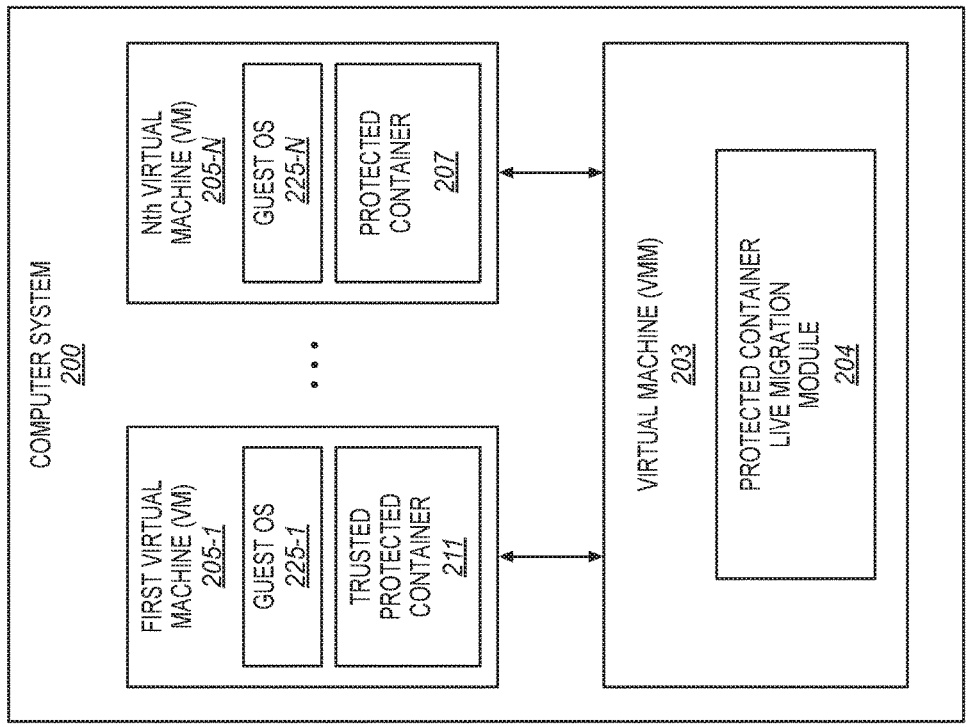
FIG. 2 is a block diagram of a first example embodiment of a software environment in which live migration may be performed on a protected container of a virtual machine.

FIG. 2 is a block diagram of a first example embodiment of a software environment in which live migration may be performed on a protected container 207 of a virtual machine (VM) 205-N. The computer system includes a virtual machine monitor (VMM) 203, and a first VM 205-1 through an Nth VM 205-N. The VMM may include hardware, firmware, software, or a combination, to provide virtualization management or control to allow the computer system to support the VMs. Representatively, the VMM may manage one or more processors, memory, and other resources of the computer system, and allocate resources associated therewith to the VMs. Each VM may represent a virtual or software implementation of a machine that emulates execution of programs like a physical machine. Each VM may support the execution of a guest operating system (OS). As shown, the first VM may have a first guest OS 225-1 and the Nth VM may have an Nth guest OS 225-N. The OSs may either be the same or different. The Nth VM is to utilize the protected container 207. The first VM may include a trusted protected container 211 (e.g., an architectural enclave, specially privileged protected container, specially trusted protected container that is trusted by other enclaves, etc.). The VMM may include a protected container live migration module 204 to control or manage the migration of the protected container 207 from the computer system to another computer system. At least one processor (not shown) of the computer system may have at least one protected container key management instruction as disclosed elsewhere herein, and logic to perform the at least one instruction.

Figure 3:
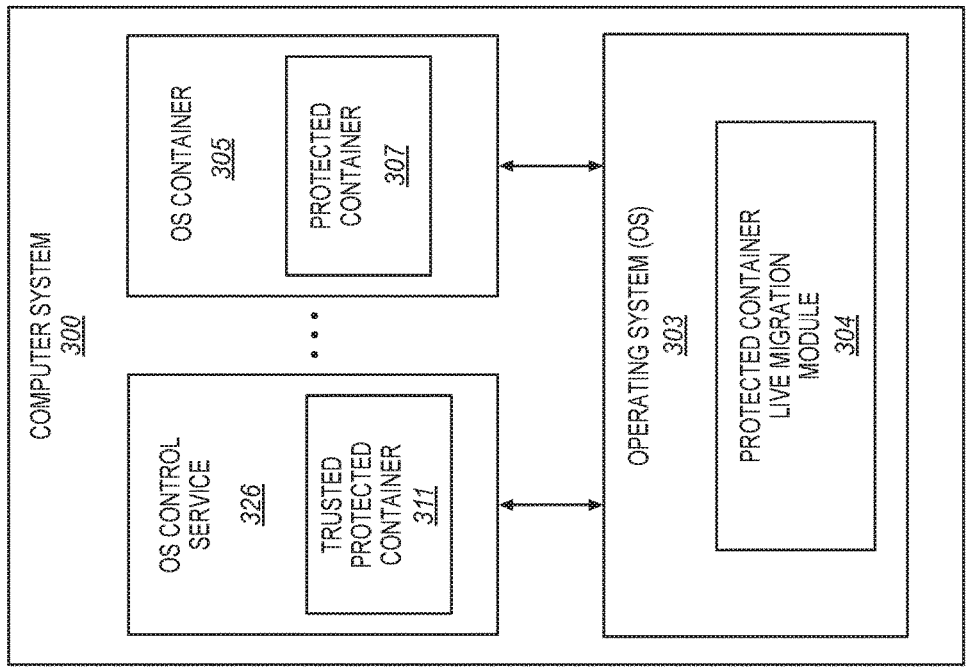
FIG. 3 is a block diagram of a second example embodiment of a software environment in which migration may be performed on a protected container of an operating system container.

FIG. 3 is a block diagram of a second example embodiment of a software environment in which live migration may be performed on a protected container 307 of an operating system (OS) container 305. The computer system includes an OS 303, the OS container 305 having the protected container 307, and an OS control service 326. The OS 303 may represent the kernel, and may provide for container-based virtualization or OS virtualization. The OS container may represent an application within the OS that represent the virtualization layer similar to guest virtual machines. The OS may include a protected container live migration module 304 to control or manage migration of the protected container from the computer system to another computer system. The OS control service may include a trusted protected container 311. At least one processor (not shown) of the computer system may have at least one protected container key management instruction as disclosed elsewhere herein, and logic to perform the at least one instruction.

FIG. 4 is a block flow diagram of one example embodiment of a method 430 of migration of a protected container from a source computer system to a destination computer system. In some embodiments, the method may be controlled or managed by privileged system software (e.g., protected container live migration module 104) and a trusted protected container (e.g., trusted protected container 111) working together.

At block 431, copies of pages of the protected container may be stored from a protected container memory of the source computer system to copies in a regular memory of the destination computer system, while an application or domain (e.g., a guest application of a VM, OS container, etc.) that is using the protected container is live and running on the source computer system. Without limitation, in some embodiments, valid copies of these pages may be able to remain in the protected container memory of the source computer system, and may be used by the domain during the live migration. In order to reduce the amount of downtime needed to achieve the full migration of the protected container, often up to as many pages as possible may be copied, while the application or domain is running on the source computer system. For example, all of the protected container pages may be iterated through one or more times, copying them from the protected container memory. Typically, after a few iterations, the set of remaining uncopied protected container pages should approximately converge to the write working set of pages, which are those that tend to be written during the migration window or timeframe, and will be recopied.

At block 432, execution of the application or domain that is using the protected container on the source computer system may be stopped. In various embodiments, the application may optionally be a guest application of a VM or an OS container, although this is not required.

At block 433, one or more keys may be stored from a protected container key deployment structure (e.g., the protected container key deployment structure 128) corresponding to the protected container that is being migrated, to a protected container key repository structure (e.g., the protected container key repository structure 127). In some embodiments, this may be performed by privileged system software (e.g., a VMM or OS) performing a relinquish protected container key instruction. In some embodiments, this may be performed as described below in conjunction with FIG. 7.

At block 434, copies of any remaining uncopied pages, and optionally any remaining uncopied special pages, may be copied from the protected container memory of the source computer system to copies in regular memory of the destination computer system, after the application or domain that was using the protected container has stopped running. In some embodiments, such special pages may include, among possibly others, the protected container key repository structure (e.g., the protected container key repository structure 127).

At block 435, an application or domain that is to use the protected container on the destination computer system may start running. In various embodiments, the application may optionally be a guest application of a VM or an OS container, although this is not required.

At block 436, pages, and optionally special pages, may be loaded from the regular memory of the destination computer system to pages in a protected container memory of the destination computer system. For example, a protected container may be created and initialized in the protected container memory of the destination computer system, and then pages may be loaded into the protected container. In some embodiments, such special pages may include, among possibly others, the protected container key repository structure (e.g., the protected container key repository structure 127).

At block 437, one or more keys may be stored from a protected container key repository structure (e.g., the protected container key repository structure 127), to a protected container key deployment structure (e.g., the protected container key deployment structure 128). In some embodiments, this may be performed by privileged system software (e.g., a VMM or OS) performing an obtain protected container key instruction. In some embodiments, this may be performed as described below in conjunction with FIG. 6. The privileged system software may then use the protected container key deployment structure (e.g., to schedule a VM).

It is to be appreciated that this is just one example illustrative embodiment of a suitable method for migration of a protected container from a source computer system to a destination computer system. Other embodiments are also contemplated and will be apparent to those skilled in the art, and having the benefit of the present disclosure.

Figure 5:
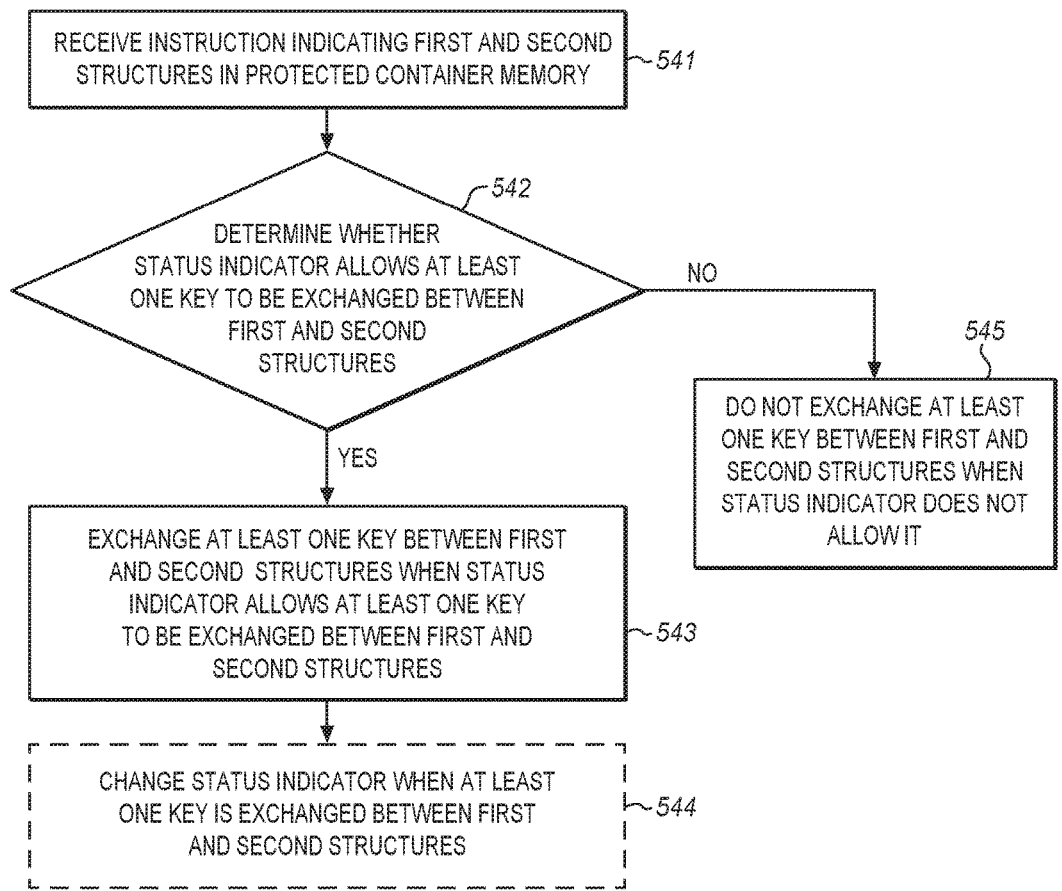
FIG. 5 is a block flow diagram of an embodiment of a method of performing an embodiment of an obtain protected container key instruction.

FIG. 5 is a block flow diagram of an embodiment of a method 540 of performing an embodiment of a key management instruction. In various embodiments, the method may be performed by a processor, instruction processing apparatus, digital logic device, or integrated circuit.

The method includes receiving the instruction, at block 541. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.).

Figure 6:
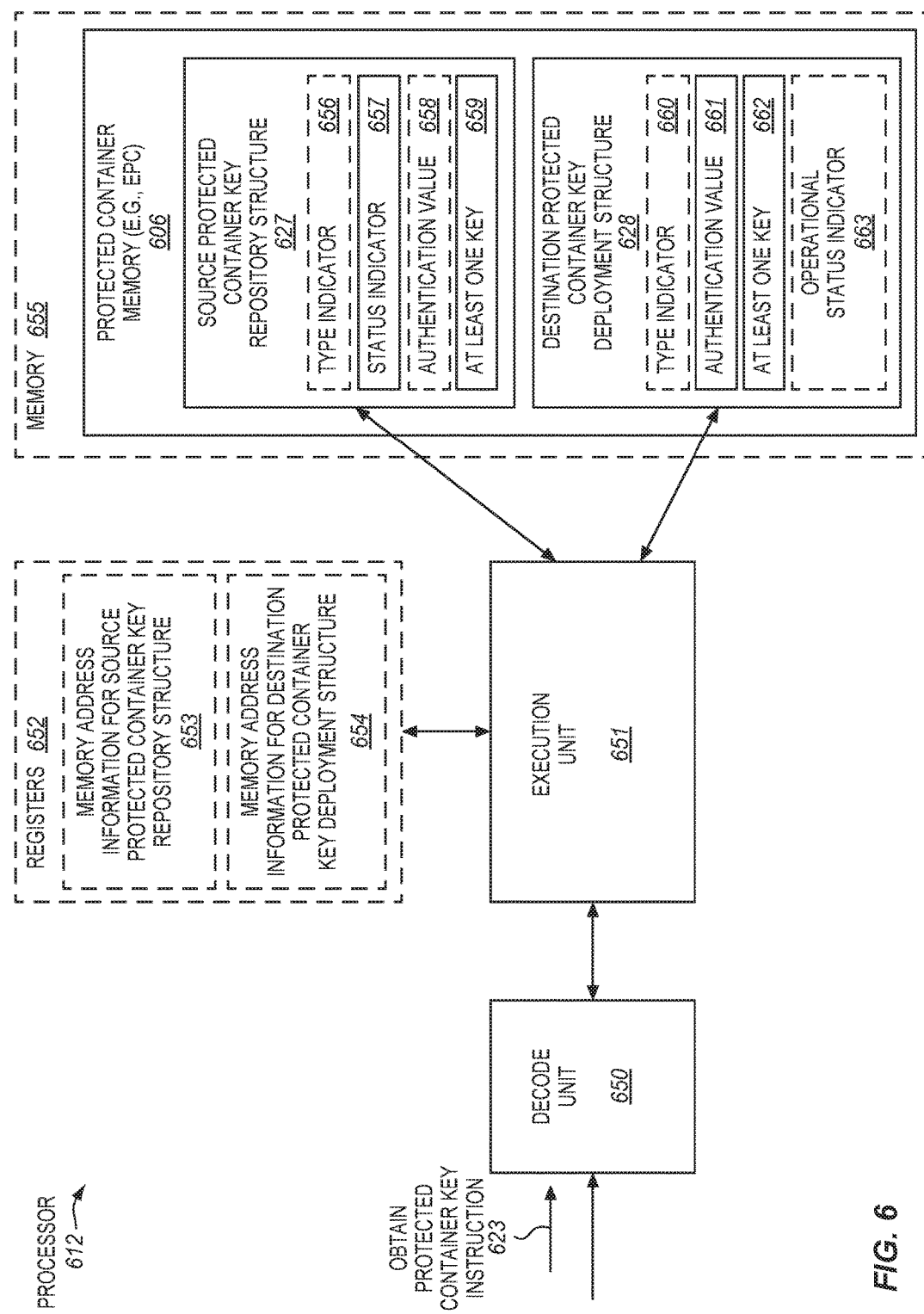
FIG. 6 is a block diagram of an embodiment of a processor that is operative to perform an embodiment of an obtain protected container key instruction.

In some embodiments, the instruction may be an obtain protected container key instruction (e.g., the obtain protected container key instruction 623 discussed for FIG. 6). In other embodiments, the instruction may be a relinquish protected container key instruction (e.g., the relinquish protected container key instruction 724 discussed for FIG. 7). The instruction may specify or otherwise indicate a first page or other structure in a protected container memory and a second page or other structure in a protected container memory. In some embodiments, the first and second structures may be protected container key repository and protected container key deployment structures as disclosed elsewhere herein. The protected container memory may be similar to or the same as that described elsewhere herein.

A determination may be made, at block 542, whether a status indicator allows at least one key to be exchanged between the first and second structures, in response to the instruction. In some embodiments, the status indicator may be included in one of the structures, and may be writable by a trusted protected container, but not by privileged system software.

If the determination is that the status indicator allows the at least one key to be exchanged between the first and second structures (i.e., "yes" is the determination), the method may advance to block 543. At block 543, the at least one key may be exchanged between the first and second structures, in response to the instruction. Then, at block 544, the status indicator may optionally be changed at times when the at least one key is exchanged between the first and second structures, in response to the instruction. In this example, two different structures are used, although in other embodiments the first and second structures may represent the same actual structure (e.g., the same page, same data structure, or the like), and a property the structure may be changed so that it logically represents different structures and/or different types of structures. For example, a bit may be set to indicate that it is a different type of structure or logically represents the other structure.

Alternatively, if the determination at block 542 is that the status indicator does not allow the at least one key to be exchanged between the first and second structures (i.e., "no" is the determination), the method may advance to block 545. At block 545, the at least one key may not be exchanged between the first and second structures, in response to the instruction, and the instruction may retire or otherwise commit.

The operations of the illustrated method 540 are performed as part of performing the embodiment of the single key management instruction. However, in other embodiments, the operations of blocks 542-545 may optionally be performed not in response to performing such a single instruction. For example, the operations may be performed responsive to a request through an interface, an input/output indication, a signal to a security coprocessor, or the like. For example, a security coprocessor or other core may include a firmware routine or other logic to perform such operations, whether it is provided a single instruction, a request through an interface, an input/output request or indication, or other signal.

FIG. 6 is a block diagram of an embodiment of a processor 612 that is operative to perform an embodiment of an obtain protected container key instruction 623 to conditionally exchange at least one key between structures. In some embodiments, the processor 612 and/or the instruction 623 may be used to perform the method 540 of FIG. 5. The components, features, and specific optional details described herein for the processor 612 and/or the instruction 623, also optionally apply to the method 540. Alternatively, the method 540 may be performed by and/or within a similar or different processor or apparatus and/or using a similar or different instruction. Moreover, the processor 612 may perform methods the same as, similar to, or different than the method 540.

In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, and digital signal processors (DSPs). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include be disposed on at least one integrated circuit or semiconductor die. In some embodiments, the processor may include at least some hardware (e.g., transistors, capacitors, diodes, circuitry, non-volatile memory storing microcode, or the like).

During operation, the processor 612 may receive the obtain protected container key instruction 623. For example, the instruction may be received from memory on a bus or other interconnect. The instruction may represent a macro-instruction, machine code instruction, machine language instruction, or other instruction or control signal of an instruction set of the processor. In some embodiments, the instruction may optionally have an opcode to indicate that the operation to be performed is to obtain a protected container key. In other embodiments, the opcode as well as additional information may optionally be used to indicate this. For example, in addition to the opcode, the instruction may specify (e.g., explicitly specify) or otherwise indicate (e.g., implicitly indicate) a register (e.g., a general-purpose register) that may have additional information to indicate, in combination with the opcode, that the operation to be performed is to obtain a protected container key.

In some embodiments, the instruction 623 may be a privileged-level instruction that may only be performed at a privileged-level of execution, but not at an unprivileged-level (e.g., user-level) of execution. For example, the instruction may only be performed by an operating system, a virtual machine monitor (VMM), or other privileged system software, but not by user-level application software. In some embodiments, the privileged system software may optionally use the instruction as part of live migration of protected containers (e.g., in conjunction with live migration of a virtual machine), although the scope of the invention is not so limited. As one example, the instruction may be performed at block 437 of FIG. 4, although the scope of the invention is not so limited. The instruction may also optionally be used for other purposes besides migration of protected containers, subject to the creativity of the programmer.

In some embodiments, the instruction 623 may explicitly specify (e.g., through one or more fields or a set of bits), or otherwise indicate (e.g., implicitly indicate) a source protected container key repository structure 627, and may explicitly specify or otherwise indicate a destination protected container key deployment structure 628. For simplicity in this text, the protected container key repository structure (whether it is a source or a destination) may also be referred to simply as a repository structure, and the protected container key deployment structure (whether it is a source or a destination) may also be referred to simply as a deployment structure. In some embodiments, each of these structures may represent a page, data structure, or other structure in a protected container memory 606. As one specific example, in an Intel® SGX implementation embodiment, the protected container memory may be an enclave page cache (EPC). The protected container memory may optionally be stored in memory 655 coupled with the processor. Alternatively, the protected container memory may optionally be one or more caches or other on-die storage of the processor.

In some embodiments, the repository structure may optionally be owned by and/or assigned to a trusted protected container (e.g., the trusted protected container 111, which may be responsible for migration). For example, the repository structure may optionally be managed by and readable and writable by, the trusted protected container. The trusted protected container may be able to read from and/or write to the repository structure. In some embodiments, the repository structure may optionally be inaccessible to privileged system software (e.g., the privileged system software 103), such as, for example, a VMM. In contrast, in some embodiments, the deployment structure may be owned by and/or assigned to privileged system software (e.g., the privileged system software 103), such as, for example, a VMM. For example, the deployment structure may be managed by the privileged system software, but not readable and not writable by, the privileged system software. The VMM or other privileged system software may potentially or optionally use the deployment structure to deploy keys (e.g., schedule VMs and protected containers that are to use the keys). In some embodiments, the deployment structure may represent a protected container independent or agnostic structure that may be used for multiple different protected containers. However, the privileged system software may generally not be able to read from and/or write to the deployment structure. In some embodiments, the deployment structure may optionally be inaccessible to the trusted protected container (e.g., the trusted protected container 111), for example, because it may be in the address space of the privileged system software.

The repository structure 627 and deployment structure 628 may be indicated by the instruction 623 in different ways in different embodiments. In some embodiments, the instruction 623 may explicitly specify (e.g., through one or more fields or a set of bits), or otherwise indicate (e.g., implicitly indicate), a first register (e.g., one of the registers 652) that is to store memory address information 653 for the source protected container key repository structure 627. In some embodiments, the instruction 623 may also explicitly specify or otherwise indicate a second register that is to store memory address information 654 for the destination protected container key deployment structure 628. By way of example, the memory address information may include a page aligned effective address of a page in the protected container memory. As one example, the instruction may optionally have register specification fields to specify the registers. As another example, the registers may optionally be implicit, inherent, or understood for the instruction, even though the instruction may not have any non-opcode bits to specify these registers. For the latter case, upon identifying the instruction (e.g., an opcode and in some cases optionally also a leaf function or other operation qualifying information beyond the opcode) it may be implicit, inherent, or understood, although not expressed explicitly, to use these registers. In some embodiments, the memory address information in the registers may be combined with other information (e.g., information in a data segment register or other register) to form full virtual or linear addresses that may be used to access the structures. The precise way in which this is done may depend upon the particular implementation and architectural memory addressing mechanisms.

The registers 652 (e.g., general-purpose registers) may represent on-die (or on integrated circuit) storage locations that are operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

Referring again to FIG. 6, the processor includes a decode unit or decoder 650. The decode unit may receive and decode the instruction 623. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level instruction 623. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die (e.g., on die with the execution unit 651). In some embodiments, the decode unit may include at least some hardware (e.g., transistors, integrated circuitry, or on-die firmware, etc.).

Referring again to FIG. 6, the execution unit 651 is coupled with the decode unit 650 and the registers 652. In some embodiments, the execution unit may be on a die or integrated circuit (e.g., on die or integrated circuit with the decode unit). For example, the decode unit and the execution unit may be included in a same core. The execution unit may receive the one or more decoded or otherwise converted instructions or control signals that represent and/or are derived from the instruction 623. When the processor is deployed in a system, the execution unit during operation may be operative to be coupled with the memory 655. The execution unit may also receive the source protected container key repository structure 627.

The execution unit 651 may be operative in response to and/or as a result of the instruction 623 (e.g., in response to one or more instructions or control signals decoded from the instruction and/or in response to the instruction being decoded and/or in response to the instruction being provided to a decoder) to: (1) determine whether one or more conditions are satisfied; and (2) if the one or more conditions are satisfied, to store at least one protected container key 659 from the key repository structure 627 into the key deployment structure 628 as at least one protected container key 662; or (3) if the one or more conditions are not satisfied, to not store at least one protected container key 659 from the key repository structure 627 into the key deployment structure 628 as at least one protected container key 662. These conditions may be evaluated to determine whether or not to deploy the at least one key from the repository structure to the deployment structure.

In some embodiments, the execution unit 651 may be operative, responsive to the instruction 623, to determine whether a status indicator 657 of the source protected container key repository structure 627 is configured to allow the at least one protected container key 659 to be copied or otherwise stored into the destination protected container key deployment structure 628 as the at least one protected container key 662. By way of example, the status indicator 657 may represent a key deployment authorization status indicator. Examples of suitable status indicators include, but are not limited to, one or more bits in a field of the source protected container key repository structure, one or more bits in a control register of the processor, one or more bits in another control structure (e.g., the PCPMS 109), and the like. As one example, a single status bit may optionally be used, and may have a first bit value, state, or configuration (e.g., set to binary one) to indicate that storing the key from the repository structure to the deployment structure is allowed, or a second bit value, state, or configuration (e.g., cleared to binary zero) to indicate that storing the key from the repository structure to the deployment structure is not allowed. If the status indicator is configured not to allow such storage, then the execution unit may be operative not to perform such storage.

In some embodiments, the status indicator 657 may be modifiable or configurable by a trusted protected container (e.g., a MigE and/or the trusted protected container 111). The trusted protected container may modify or configure the status indicator to allow, or not allow, the at least one key 659 to be copied or otherwise stored into the deployment structure 628. For example, as shown, the status indicator may be included in the repository structure, and the repository structure may optionally be owned by, and readable and writable by, the trusted protected container. However, in some embodiments, the contents of the repository structure may optionally be inaccessible to privileged system software (e.g., the privileged system software 103), such as, for example, a VMM. By way of example, this may prevent the privileged system software from being able to read the at least one key 659, change the at least one key, modify the status indicator 657, etc. This may help to give the trusted protected container (e.g., a MigE and/or the trusted protected container 111) additional control over whether the at least one key 659 may be deployed and used by privileged system software for protected containers. The trusted protected container may configure the status indicator to allow the at least one key to be deployed out of the repository structure when it thinks it is appropriate, and otherwise may configure the status indicator not to allow it.

In some embodiments, the execution unit 651 may optionally be operative, responsive to the instruction 623, to perform one or more additional checks, before determining to store the at least one key from the repository structure to the deployment structure. However, performing these one or more additional checks is optional not required. It is to be appreciated that the number of checks needed, and the types of such checks, may vary widely from one implementation to another depending on factors such as the level of security desired, the particular way in which the protected container architecture is implemented, the characteristics of the particular architecture on which the protected container architecture is based, and the like. In some embodiments, no such additional checks may be needed. In other embodiments, there may be one or more such additional checks. Possible examples of additional types of checks that may optionally be performed include, but are not limited to, a check of whether a type indicator 656 (e.g., a page type indicator) of the repository structure is an allowed type, a check of whether a type indicator 660 (e.g., a page type indicator of a different type of page) of the deployment structure is an allowed type, a check of whether the repository structure is pending or not, a check pertaining to whether debug mode is enabled, and the like.

In some embodiments, after any such checks are performed successfully without leading to a determination not to store the at least one key 659 from the repository structure to the at least one key 662 of the deployment structure, the execution unit may be operative, responsive to the instruction 623, to copy or otherwise store the at least one key 659 from the repository structure 627 to the deployment structure 628 as at least one key 662. In some embodiments, the at least one key may be a root key that may be used to generate or provision other keys, as previously described. Advantageously, there is no requirement that the root key be fused in or otherwise fixed or tied to a processor. Rather, the repository structure may have its own migration capable root keys, and may be capable of being migrated and used on another processor (e.g., with a different set of root keys fused therein). In some embodiments, the at least one key 662 may not be accessible (e.g., not readable and not writable) by privileged system software even though the privileged system software may own the deployment structure and/or even though the deployment structure may be in the address space of the privileged system software.

In some embodiments, the execution unit 651 may also be operative, responsive to the instruction 623, to copy or otherwise store an authentication value 658 from the repository structure 627 to the deployment structure 628 as an authentication value 661. As shown in the illustrated example, an authentication value 658 may optionally be stored in the repository structure, for example by the trusted protected container. Alternatively, authentication value 658 may optionally be otherwise provided by the trusted protected container without necessarily needing to be stored in the repository structure. The authentication value may broadly represent a secret value that a trusted protected container (e.g., the trusted protected container 111) is operative to generate and store into the repository structure, but that privileged system software (e.g., a VMM) may not, except without extreme difficulty, be able to generate. Commonly, the authentication value may be a relatively large numerical value, such as, for example, a 128-bit or larger binary number. One specific suitable example of the authentication value is a 128-bit or larger key that the trusted protected container is able to generate or otherwise provide. Alternatively, other secrets or authentication values may optionally be used. As will be explained further below, the trusted protected container may use the authentication value to prove ownership or otherwise authenticate itself when subsequently accessing the deployment structure (e.g., to relinquish or take back deployed keys). In some embodiments, any instance or version of the trusted protected container may be operative to generate or otherwise provide the authentication value. This may allow a trusted protected container to terminate, be restarted, and still be able to authenticate itself in order to relinquish previously deployed keys from repository structures it owns or owned. Such uses of the authentication value for key relinquishment will be discussed further below in conjunction with FIG. 7.

Other contents may also optionally be copied or stored from the repository structure to the deployment structure if desired, although the scope of the invention is not so limited. Depending upon the particular implementation, the repository and/or deployment structures may potentially have a number of other fields. The number and type of such fields may tend to vary widely from one implementation to another. Possible examples of such fields include, but are not limited to, various control fields, a configuration debug field, fields related to identification, fields related to paging, fields related to version information, and the like, and various combinations thereof. The scope of the invention is not limited to the existence or lack thereof of any such fields. In some embodiments, to help improve efficiency, the repository and deployment structures may optionally have the same or at least similar data structure formats (e.g., predominantly the same types of fields, layout of fields, data types, etc.), although this is not required.

In some embodiments, the execution unit 651 may also be operative, responsive to the instruction 623, after storing the at least one key 662 in the deployment structure 628, to change or configure the status indicator 657 of the repository structure 627. For example, the status indicator may be changed or configured to not allow the at least one protected container key 659 of the repository structure to be copied or otherwise stored into any further deployment structure (e.g., until it is changed again to a different value that allows key deployment). For example, if a status bit needs to be set to allow such copying, that status bit may be cleared to prevent such further copying. In some embodiments, this may be performed by an atomically test and change operation responsive to the instruction, although this is not required. One purpose this may serve is to deactivate the key deployment capabilities of the repository structure and thereby help to prevent multiple copies of deployment structures from being created. Instead, only a single deployment structure may be created by the performance of the obtain protected key instruction, and while the obtain protected key instruction is being performed it may reconfigure the status indicator to not allow further deployment structures to be created and/or not allow the at least one key 659 to be stored in any further deployment structures. In this way, the instruction may enforce or guarantee that only one of the repository structure and its corresponding deployment structure are active and can be used at a given time. Advantageously, this may help to protect against replay attacks. Another purpose this may serve is providing a feedback or indication which may be observable by the trusted protected container about whether the instruction was performed successfully or not and/or whether the at least one key 662 was successfully stored into the deployment structure or not. This may allow the trusted protected container to monitor or verify that everything went as supposed to and there is only one usable copy of the at least one key.

In some embodiments, the execution unit 651 may also optionally be operative, responsive to the instruction 623, after storing the at least one key 662 in the deployment structure 628, to modify or configure an operational status indicator 663, although this is not required. For example, the operational status indicator may be configured to indicate that the deployment structure is now operational (e.g., in an operational state).

To further illustrate certain concepts, a specific detailed example of one way in which the obtain protected container key instruction may be used will be described, although the scope of the invention is not so limited. Initially, a trusted protected container may obtain at least one key from the infrastructure (e.g., on-die logic of the processor). The trusted protected container may store the at least one key 659 (e.g., a provisioning key), and the authentication value 658 (e.g., a 128-bit secret) into an existing/available or new page of a type 656 suitable for use as the repository structure 627. The trusted protected container may then configure the status indicator 657 (e.g., set an architectural bit in the repository structure) to allow key deployment. The trusted protected container may then signal privileged system software (e.g., a VMM). The privileged system software (e.g., the VMM) may then perform the obtain protected container key instruction 623 using an existing free or new protected container page in the address space of the privileged system software. This instruction may check the status indicator 657 is configured to allow key deployment. Optionally one or more additional checks may be performed as described above. Then, provided the implemented checks are successful, the at least one key 659 may be stored to the at least one key 662 in the deployment structure, and the authentication value 658 stored into the repository structure by the trusted protected container may be stored into the deployment structure as the authentication value 661. The instruction when performed may also change the status indicator 657 so that no further key deployment may be performed with the repository structure. The trusted protected container may then optionally securely verify (e.g., with a locked compare exchange operation) that the obtain protected container key instruction was performed successfully by reading the status indicator 657 to see if it has the value indicating no further keys can be deployed or obtained. The privileged system software may then use the key deployment structure 628 for protected containers (e.g., in conjunction with VM scheduling).

The execution unit 651 and/or the processor 612 may include specific or particular logic (e.g., transistors, integrated circuitry, or other hardware potentially combined with firmware (e.g., instructions stored in non-volatile memory) and/or software) that is operative to perform instruction 623 and/or store the result in response to and/or as a result of instruction 623 (e.g., in response to one or more instructions or control signals decoded from instruction 623). By way of example, the execution unit may include check logic (e.g., bit check logic) to check the status indicator 657, and memory-to-memory copy logic (e.g., which may optionally be similar to that used in other memory-to-memory copy instructions). The illustrated execution unit is shown as a single unit, although it is to be appreciated that the execution unit may potentially/optionally include logic that is distributed or dispersed over various components of the memory subsystem and protected container implementation logic of the processor. Nevertheless, such logic even if dispersed collectively represents an execution unit to perform the obtain protected container key instruction.

To avoid obscuring the description, a relatively simple processor 612 has been shown and described. However, the processor may optionally include other processor components. For example, various different embodiments may include various different combinations and configurations of the components shown and described for any of FIGS. 8-10. All of the components of the processor may be coupled together to allow them to operate as intended. By way of example, considering FIG. 8B, the instruction cache 834 may cache the instructions, the instruction fetch unit 838 may fetch the instruction, the decode unit 840 may decode the instruction, the scheduler unit 856 may schedule the associated operations, the execution unit 862 may perform the instruction, the retirement unit 854 may retire the instruction, etc.

Figure 7:
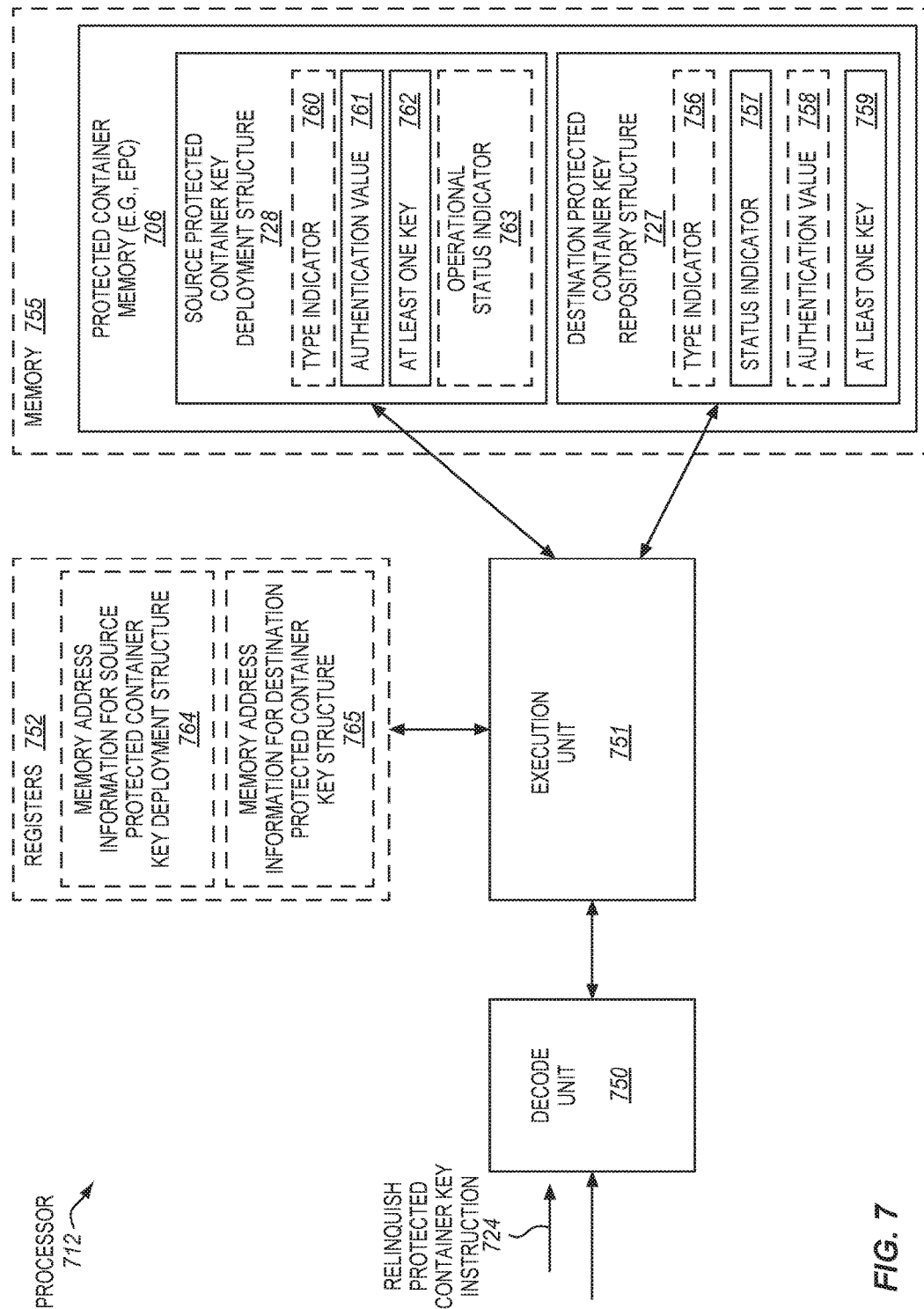
FIG. 7 is a block diagram of an embodiment of a processor that is operative to perform an embodiment of a relinquish protected container key instruction.

FIG. 7 is a block diagram of an embodiment of a processor 712 that is operative to perform an embodiment of a relinquish protected container key instruction 724 to conditionally exchange at least one key between structures. The processor 712 may be the same as, similar to, or different than, the processor 612 of FIG. 6. The processor includes a decode unit 750 operative to decode the relinquish protected container key instruction 724, an execution unit 751 operative to perform the relinquish protected container key instruction, and registers 752 operative to store memory address information 764, 765 associated with the relinquish protected container key instruction. Aside from these aspects pertaining to the relinquish protected container key instruction, unless otherwise specified, these components may optionally be similar to, or the same as, (e.g., have any one or more characteristics that are the same or similar to) the correspondingly named components of FIG. 6. Moreover, the relinquish protected container key instruction 724 may cause the processor 712 to interact with a (source) protected container key deployment structure 728 and a (destination) protected container key repository structure 727. Aside from any aspects pertaining only to the relinquish protected container key instruction, unless otherwise specified, these components may also optionally be similar to, or the same as, (e.g., have any one or more characteristics that are the same or similar to) the correspondingly named components of FIG. 6. To avoid obscuring the description, the different and/or additional characteristics of the embodiment of FIG. 7 will primarily be described, without repeating all the characteristics which may optionally be the same or similar to those described for the embodiment of FIG. 6.

During operation, the processor 712 may receive the relinquish protected container key instruction 724. In some embodiments, the instruction may optionally have an opcode to indicate that the operation to be performed is to return, give back, or otherwise relinquish a protected container key. In other embodiments, the opcode as well as additional information (e.g., a leaf function in an indicated register) may optionally be used to indicate this.

In some embodiments, the instruction 724 may explicitly specify (e.g., through one or more fields or a set of bits), or otherwise indicate (e.g., implicitly indicate) a source protected container key deployment structure 728 (e.g., a page aligned effective address of a source page in the protected container memory). Likewise, the instruction 724 explicitly specify or otherwise indicate a destination protected container key repository structure 727 (e.g., a page aligned effective address of a destination page in the protected container memory). These may be specified or otherwise indicated in the various ways previously described. In some embodiments, each of these structures may represent a page and/or a data structure in a protected container memory 706. The protected container memory may optionally be stored in memory 755 coupled with the processor or in on-die storage of the processor. Notice that the source and destination roles of the deployment and repository structures for the relinquish protected container key instruction 724 are opposite those for the obtain protected container key instruction 623.

In some embodiments, the instruction 724 may be a privileged-level instruction that may only be performed at a privileged-level of execution, but not at an unprivileged-level (e.g., user-level) of execution. In some embodiments, the privileged system software may optionally use the instruction as part of live migration of protected containers (e.g., when one or more conditions are met to relinquish or store at least one key 762 into the repository structure 727 in order to allow the at least one key to be migrated within the repository structure), although the scope of the invention is not so limited. As one example, the instruction may be performed at block 433 of FIG. 4, although the scope of the invention is not so limited.

In some embodiments, the deployment structure 728 may be owned by (e.g., assigned or allocated to) privileged system software (e.g., the privileged system software 103), such as, for example, a VMM. However, the privileged system software may generally not be able to read from and/or write to the deployment structure. The VMM or other privileged system software may use the deployment structure to deploy at least one key 762 (e.g., in conjunction with scheduling a VM and an associated protected container that are to use the at least one key). In some embodiments, the deployment structure may optionally be capable of being used by multiple protected containers. In some embodiments, the deployment structure may optionally be inaccessible to a trusted protected container (e.g., the trusted protected container 111). In contrast, in some embodiments, the repository structure 727 may optionally be owned by (e.g., assigned or allocated to) the trusted protected container. The trusted protected container may be able to read from and/or write to the repository structure. In some embodiments, the repository structure may optionally be inaccessible to the privileged system software (e.g., inaccessible to the VMM). The different ownership and access rights to these two different types of structures may be used to help manage and protect the keys (e.g., from replay attacks, etc.).

Referring again to FIG. 7, the processor includes a decode unit or decoder 750. The decode unit may receive and decode the relinquish protected container key instruction 724. The execution unit 751 is coupled with the decode unit and the registers 752. The execution unit during operation may be coupled with the memory 755. The execution unit 751 may be operative in response to and/or as a result of the instruction 724 (e.g., in response to one or more instructions or control signals decoded from the instruction and/or in response to the instruction being decoded and/or in response to the instruction being provided to a decoder) to: (1) determine whether one or more conditions are satisfied; and (2) if the one or more conditions are satisfied, to store at least one protected container key 762 from the deployment structure 728 into the repository structure 727 as at least one protected container key 759; or (3) if the one or more conditions are not satisfied, to not store at least one protected container key 762 from the deployment structure 728 into the repository structure 727 as at least one protected container key 759. These conditions may be evaluated to determine whether or not relinquishing the at least one key 762 into the repository structure 727 maintains security and is authorized (e.g., by a trusted protected container).

In some embodiments, the execution unit 751 may be operative, responsive to the instruction 724, to determine whether a status indicator 757 of the destination protected container key repository structure 727 is configured to allow the at least one protected container key 762 to be copied or otherwise stored into the repository structure 727 as the at least one protected container key 759. Examples of suitable status indicators include, but are not limited to, one or more bits in a field of the repository structure, one or more bits in a control register of the processor, one or more bits in another control structure (e.g., the PCPMS 109) and the like. As one example, a single status bit may optionally be used, and may have a first bit value, state, or configuration (e.g., set to binary one) to indicate that storing the key from the deployment structure to the repository structure is allowed, or a second bit value, state, or configuration (e.g., cleared to binary zero) to indicate that storing the key from the deployment structure to the repository structure is not allowed. In some embodiments, the status indicator 757 may optionally be a separate status indicator than the status indicator 657 (e.g., there may optionally be two), although this is not required. For example, the status indicator 657 may represent a key deployment authorization status bit, and the status indicator 757 may represent a key relinquishment authorization status bit. If the status indicator is configured not to allow such storage, then the execution unit may be operative not to perform such storage.

In some embodiments, the status indicator 757 may be modifiable or configurable by a trusted protected container (e.g., the trusted protected container 111). The trusted protected container may modify or configure the status indicator to allow, or not allow, the relinquishment or release of the at least one key 762 into the repository structure 727 as the at least one key 759. As previously described the repository structure 727 may optionally be owned by, and readable and writable by, the trusted protected container. This may allow the trusted protected container to decide and control when the at least one key 762 may be stored into the repository structure. However, in some embodiments, the contents of the repository structure may optionally be inaccessible to privileged system software (e.g., the privileged system software 103), such as, for example, a VMM. This may prevent the privileged system software from being able to read the at least one key 759, change the at least one key, modify the status indicator 757, etc.

In some embodiments, the execution unit 751 may also be operative, responsive to the instruction 724, to perform an authentication using the authentication value 761 of the deployment structure 728. The authentication value 761 may optionally be similar to or the same as the authentication value 661 described above. Recall from the discussion for FIG. 6 that the authentication value 661 may have originally been generated or otherwise provided by a trusted protected container, and stored into the deployment structure 628. The authentication of the this authentication value 761 may involve checking for an identical, or otherwise matching or compatible, authentication value, as a pre-condition or safety check before storing the at least one key 762 to the repository structure as the at least one key 759. As shown in the illustrated example, an authentication value 758 may optionally be stored in the repository structure, for example by the trusted protected container. Alternatively, authentication value 758 may optionally be otherwise provided by the trusted protected container without necessarily needing to be stored in the repository structure. The execution unit may be operative to determine whether the authentication value 761 and the authentication value 758 are identical or otherwise compatible. The same trusted protected container which has been constantly running, or another instance of the same trusted protected container that has been started after being terminated, may be operative to deterministically generate or otherwise provide the same authentication value 758, whether it is stored into the repository structure or merely provided to the execution unit for comparison. Each different trusted protected container may be operative to only generate a corresponding different or unique authentication value. In addition, it may be extremely difficult for other privileged system software and/or other entities to be able to generate this authentication value or secret. Accordingly, the trusted protected container may use the authentication value 758 to authenticate itself and/or prove ownership of the at least one key 762 when the at least one key 762 is taken back or relinquished into the repository structure. If the two authentication values are not compatible, then the execution unit may be operative not to store the at least one key 762 into the repository structure 727.

In some embodiments, the execution unit 751 may be operative, responsive to the instruction 724, to determine whether an operational status indicator 763 of the deployment structure 728 is configured to allow the at least one protected container key 762 to be copied or otherwise stored into the repository structure 727 as the at least one protected container key 759. In some embodiments, the operational status indicator 763 may optionally be the same as the previously described operational status indicator 663. By way of example, the operational status indicator 763 may be configured to allow the at least one protected container key to be stored into the repository structure when it has a value that indicates that the deployment structure is operational (e.g., in an operational state) and may be used for providing keys to protected containers. Examples of suitable status indicators include, but are not limited to, one or more bits in a field of the repository structure, one or more bits in a control register of the processor, one or more bits in another control structure (e.g., the PCPMS 109) and the like. As one example, a single status bit may optionally be used, and may have a first bit value, state, or configuration (e.g., set to binary one) to indicate that storing the key is allowed and/or the deployment structure is operational, or a second different configuration (e.g., cleared to binary zero) to indicate that storing the key is not allowed and/or the deployment structure is not operational. If the operational status indicator is configured not to allow such storage, then the execution unit may be operative not to perform such storage.

In some embodiments, the execution unit 751 may optionally be operative, responsive to the instruction 724, to perform one or more additional checks, before determining to store the at least one key 762 from the repository structure to the deployment structure. However, performing these one or more additional checks is optional not required. It is to be appreciated that the number of checks needed, and the types of such checks, may vary widely from one implementation to another depending on factors such as the level of security desired, the particular way in which the protected container architecture is implemented, the characteristics of the particular architecture on which the protected container architecture is based, and the like. In some embodiments, no such additional checks may be needed. In other embodiments, there may be one or more such additional checks. Possible examples of additional types of checks that may optionally be performed include, but are not limited to, a check of whether a type indicator 756 (e.g., a page type indicator) of the repository structure is an allowed type, a check of whether a type indicator 760 (e.g., a page type indicator of a different type of page) of the deployment structure is an allowed type, a check of whether the repository structure is pending or not, a check pertaining to whether debug mode is enabled, and the like.

In some embodiments, after any such checks are performed successfully without leading to a determination not to store the at least one key 762 from the deployment structure 728 to the repository structure 727, the execution unit 751 may be operative, responsive to the instruction 724, to copy or otherwise store the at least one key 762 from the deployment structure 728 to the repository structure 727 as at least one key 759. In some embodiments, the at least one key may include a root key that may be used to generate or provision other keys, as previously described.

Without limitation, other contents may also optionally be copied or stored from the repository structure to the deployment structure if desired, although the scope of the invention is not so limited. Depending upon the particular implementation, the repository and/or deployment structures may potentially have a number of other fields. The number and type of such fields may tend to vary widely from one implementation to another. Possible examples of such fields include, but are not limited to, various control fields, a configuration debug field, fields related to identification, fields related to paging, fields related to version information, and the like, and various combinations thereof. The scope of the invention is not limited to the existence or lack thereof of any such fields. In some embodiments, to help improve efficiency, the repository and deployment structures may optionally have the same or at least similar data structure formats (e.g., predominantly the same types of fields, layout of fields, data types, etc.), although this is not required.

In some embodiments, the execution unit 751 may also optionally be operative, responsive to the instruction 724, after storing the at least one key 759 into the repository structure 727, to modify or configure the operational status indicator 763 to have a different value, although this is not required. For example, the operational status indicator may be configured to indicate that the deployment structure is now not operational or inactive (e.g., not in an operational state). In some embodiments, this may be performed by an atomically test and change operation, although this is not required. In some embodiments, this may be operative to prevent deployment structure from being used to provide any keys to any protected containers (e.g., privileged system software may not be able to use the deployment structure.

In some embodiments, the execution unit 751 may also be operative, responsive to the instruction 724, after storing the at least one key 759 into the repository structure 727, to change or configure the status indicator 757 of the repository structure 727. For example, the status indicator may be changed or configured to a different value than it had before the instruction was successfully performed. In some embodiments, this may optionally be performed by an atomically test and change operation, although this is not required. One purpose this may serve is to deactivate the key relinquishment capabilities of the repository structure and thereby help to prevent multiple structures from being created. Another purpose this may serve is providing a feedback or indication observable by the trusted protected container about whether the instruction was performed successfully or not and/or whether the at least one key 762 was successfully relinquished into the repository structure or not.

To further illustrate certain concepts, a specific detailed example of one way in which the relinquish protected container key instruction may be performed and used will be described, although the scope of the invention is not so limited. By way of example, this may be performed when a VM is taken down to prepare for migration, although the scope of the invention is not so limited. The trusted protected container may prepare to take control back of the at least one key 762. The trusted protected container may store the authentication value 758 (e.g., a 128-bit secret) into an existing/available or new page of a type 756 suitable for use as the repository structure 727. The authentication value needs to be one that matches or is otherwise compatible with the authentication value 761 in the deployment structure. The trusted protected container may then configure the status indicator 757 (e.g., set an architectural bit in the repository structure) to allow key relinquishment. The trusted protected container may then signal privileged system software (e.g., a VMM). The privileged system software (e.g., the VMM) may then perform the relinquish protected container key instruction 724 on a deployment structure 728 in its address space. This instruction may check the status indicator 757 is configured to allow key relinquishment. This instruction may check the authentication value 758 matches or is compatible with the authentication value 761. Optionally one or more additional checks may be performed as described above. Then, provided the implemented checks are successful, the at least one key 762 may be stored to the at least one key 759 in the repository structure. The instruction when performed may also change the status indicator 757. The trusted protected container may then optionally securely verify (e.g., with a locked compare exchange operation) that the relinquish protected container key instruction was performed successfully by reading the status indicator 757 to see if it has a changed value indicating that the instruction completed successfully. In some embodiments, the repository structure may then be migrated from a source computer system to a destination computer system (e.g., in conjunction with migrating protected container pages of a VM), although the scope of the invention is not so limited.

In FIGS. 6-7, single instructions have been used to perform the operations described above. However, in other embodiments, such operations may optionally be performed not in response to performing such single instructions. For example, such operations may be performed responsive to a request through an interface, an input/output indication, a signal, command, or communication to a security coprocessor, or the like. For example, a security coprocessor or other core may include a firmware routine or other logic to perform such operations, whether it is provided a single instruction, a request through an interface, an input/output request or indication, a command stored in a command register, or other signal or communication.

In the illustrated examples of FIGS. 6-7, in order to better illustrate certain concepts, two different structures were shown and described. In other embodiments, the repository and deployment structures may optionally represent logically different versions of the same physical page, data structure, or other structure. For example, the same structure may be logically treated as being alternatively either the repository structure or the deployment structure at different times. For example, a bit may be set or cleared in the same structure to indicate which one it is. For example, the bit may have a first value (e.g., binary zero) to indicate that the structure is the deployment structure, or a second different value (e.g., binary one) to indicate that the structure is currently the repository structure.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
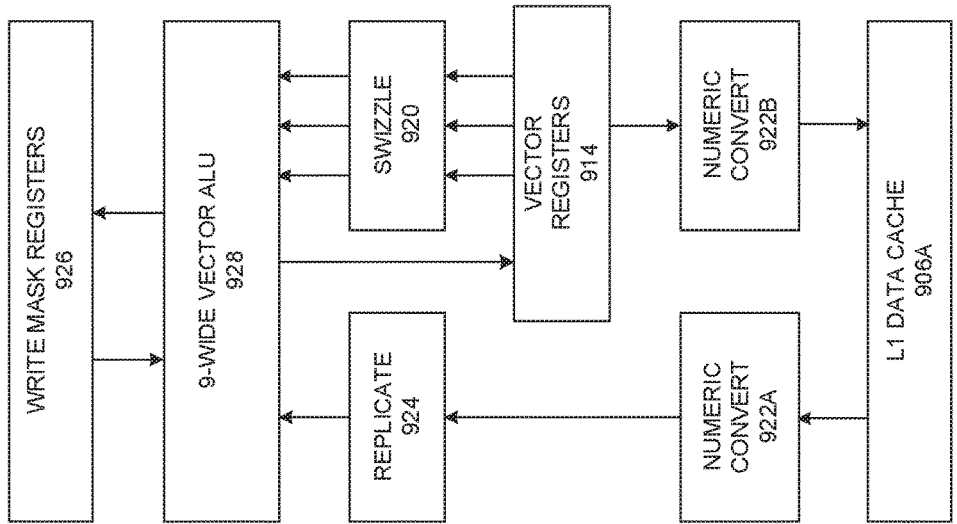
FIG. 9B is a block diagram of an embodiment of an expanded view of part of the processor core of FIG. 9A.
Figure 9A:
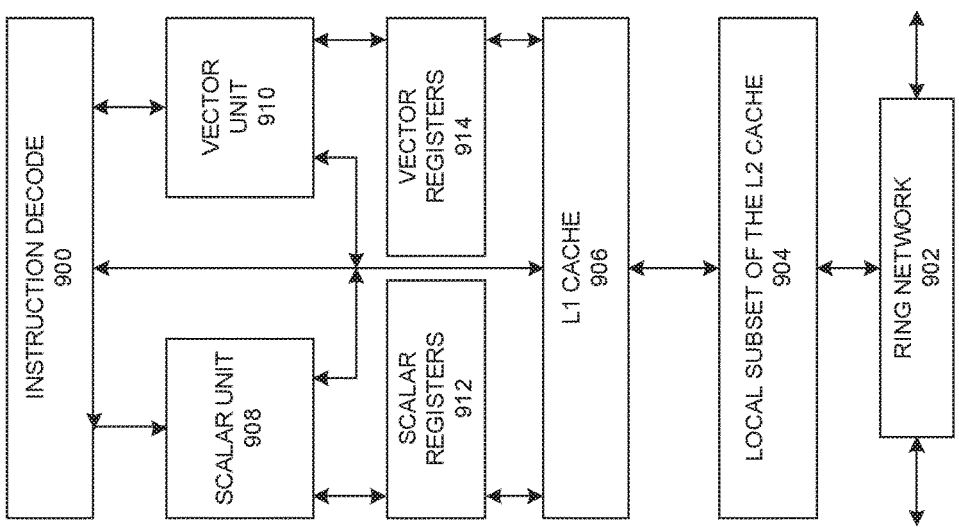
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 1912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
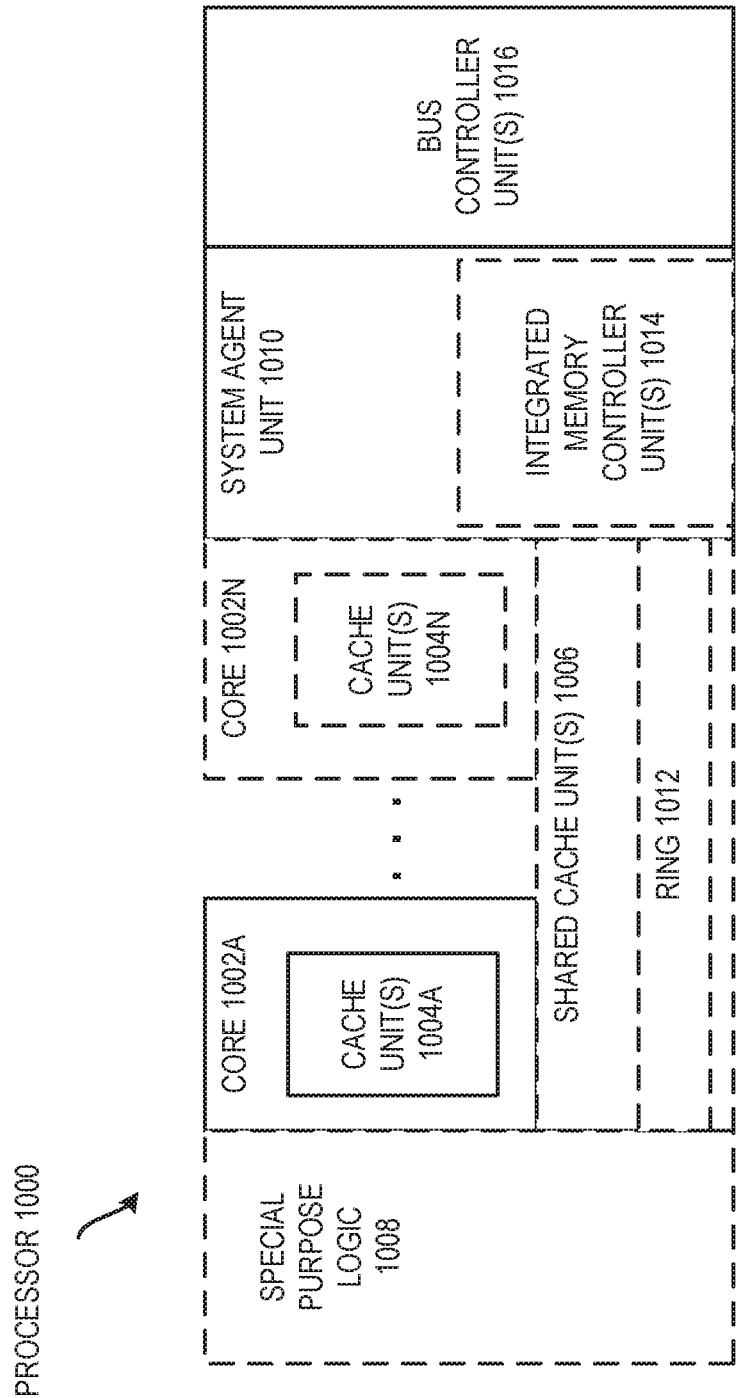
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
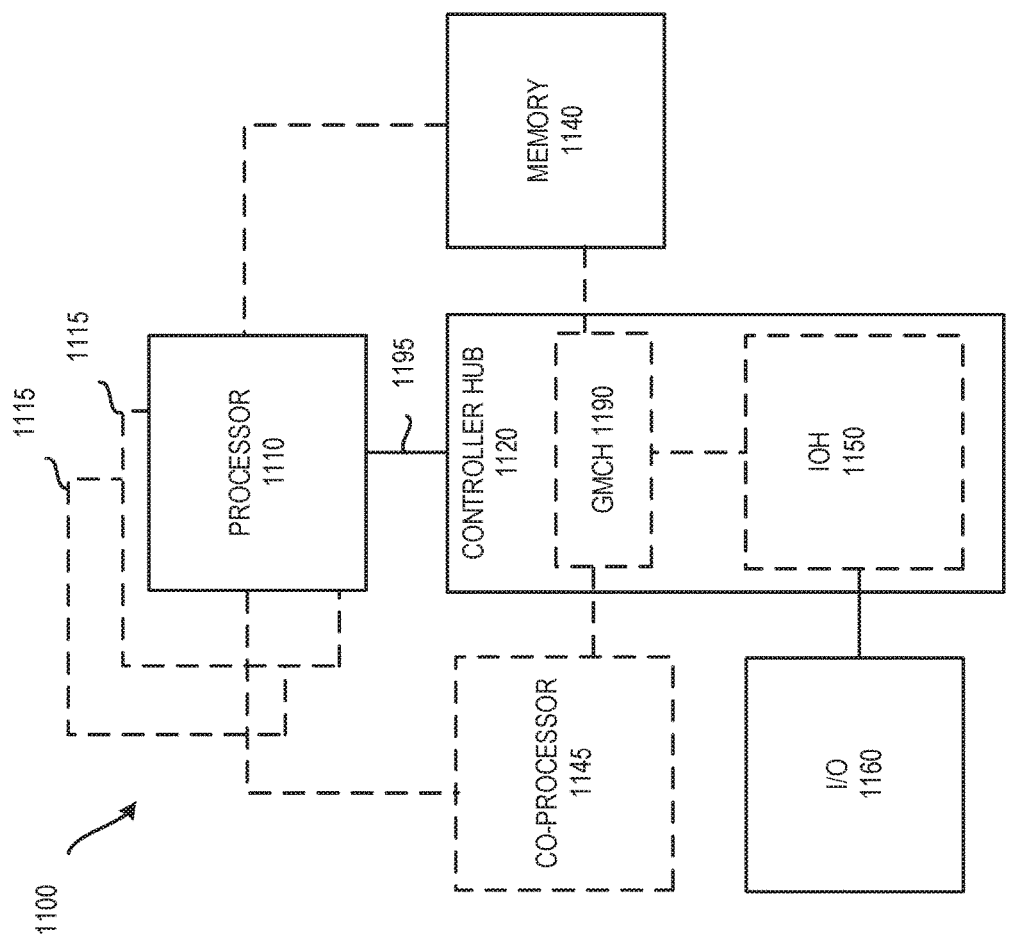
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
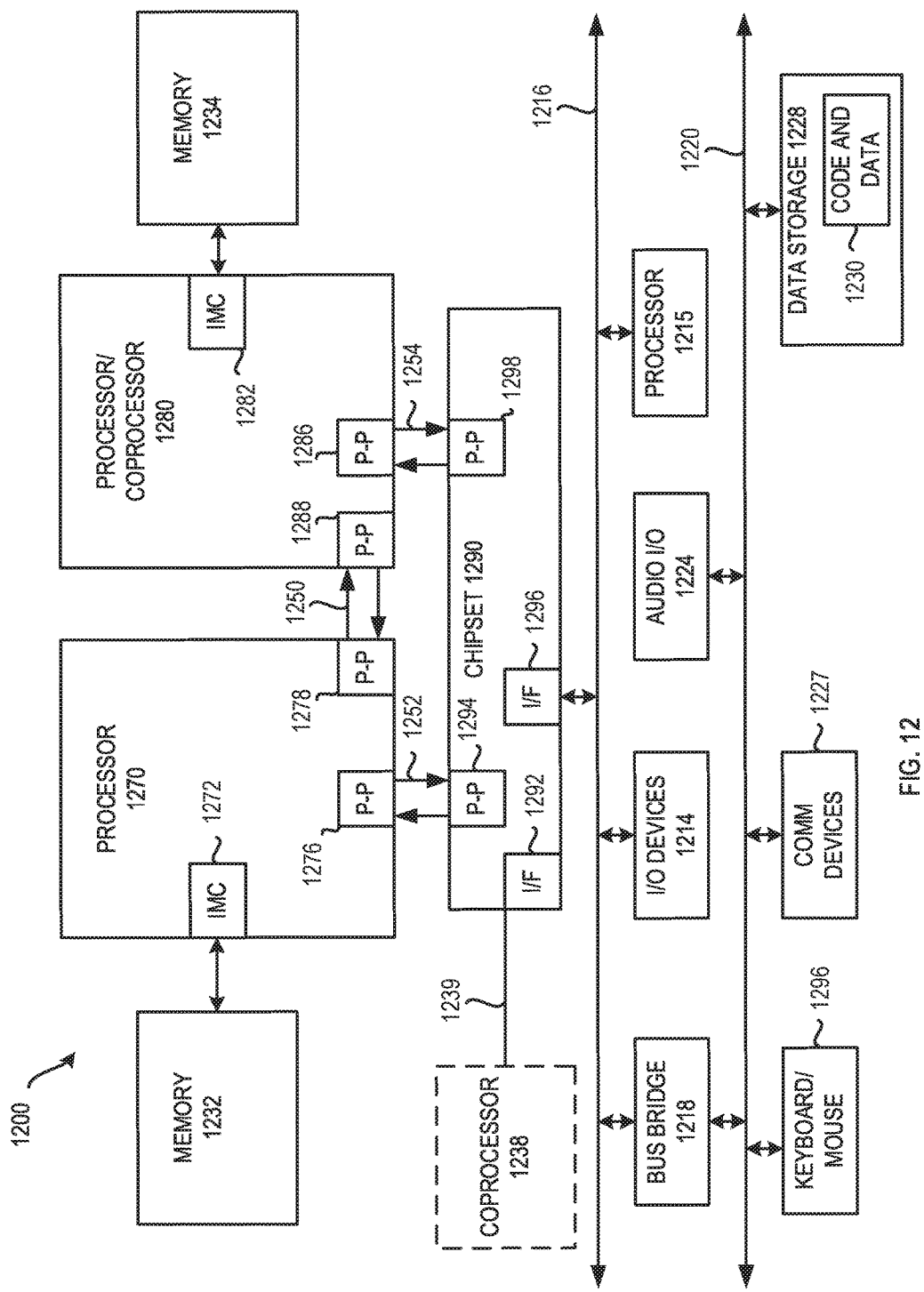
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
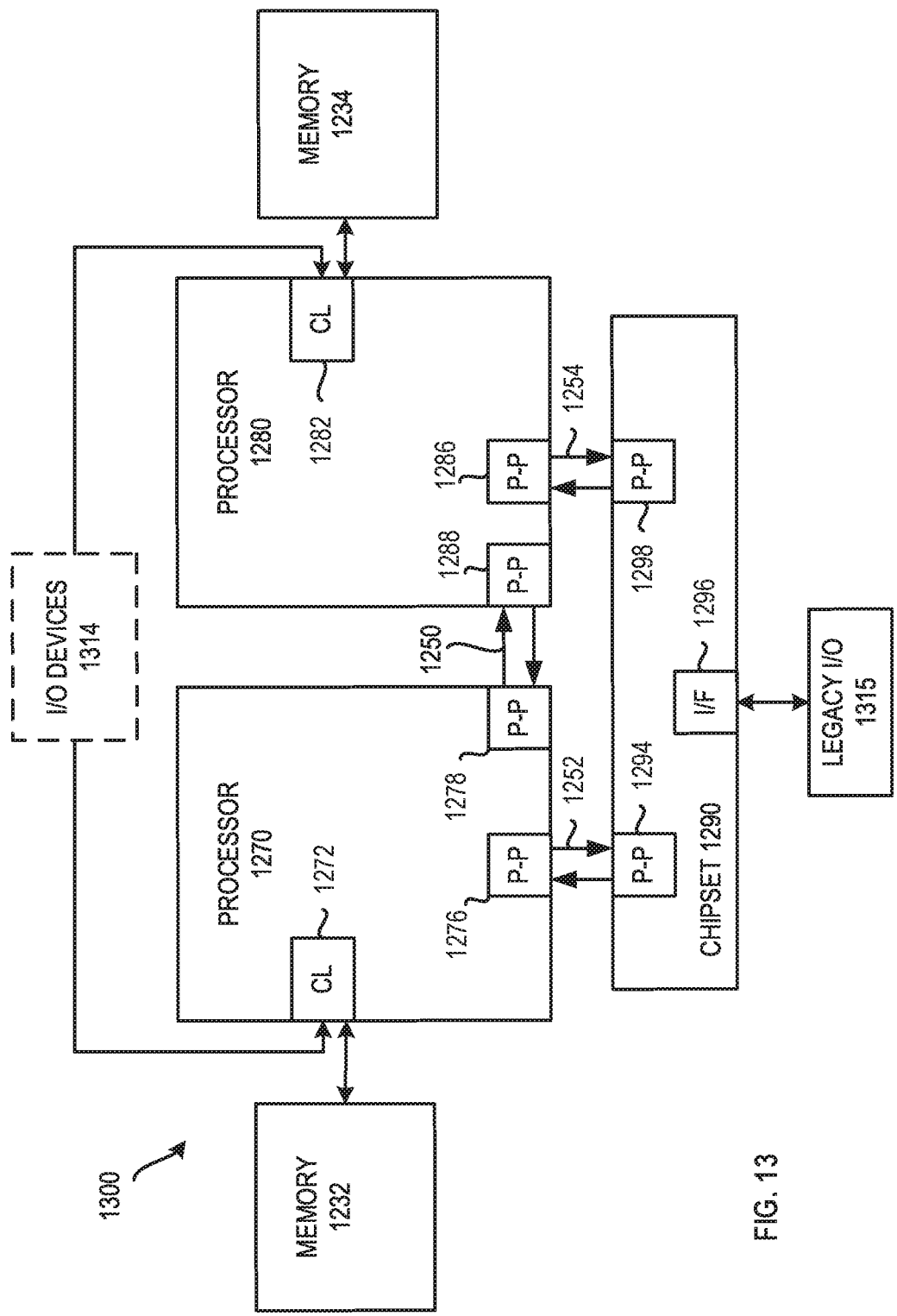
FIG. 13 is a block diagram of a third embodiment of a computer architecture.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
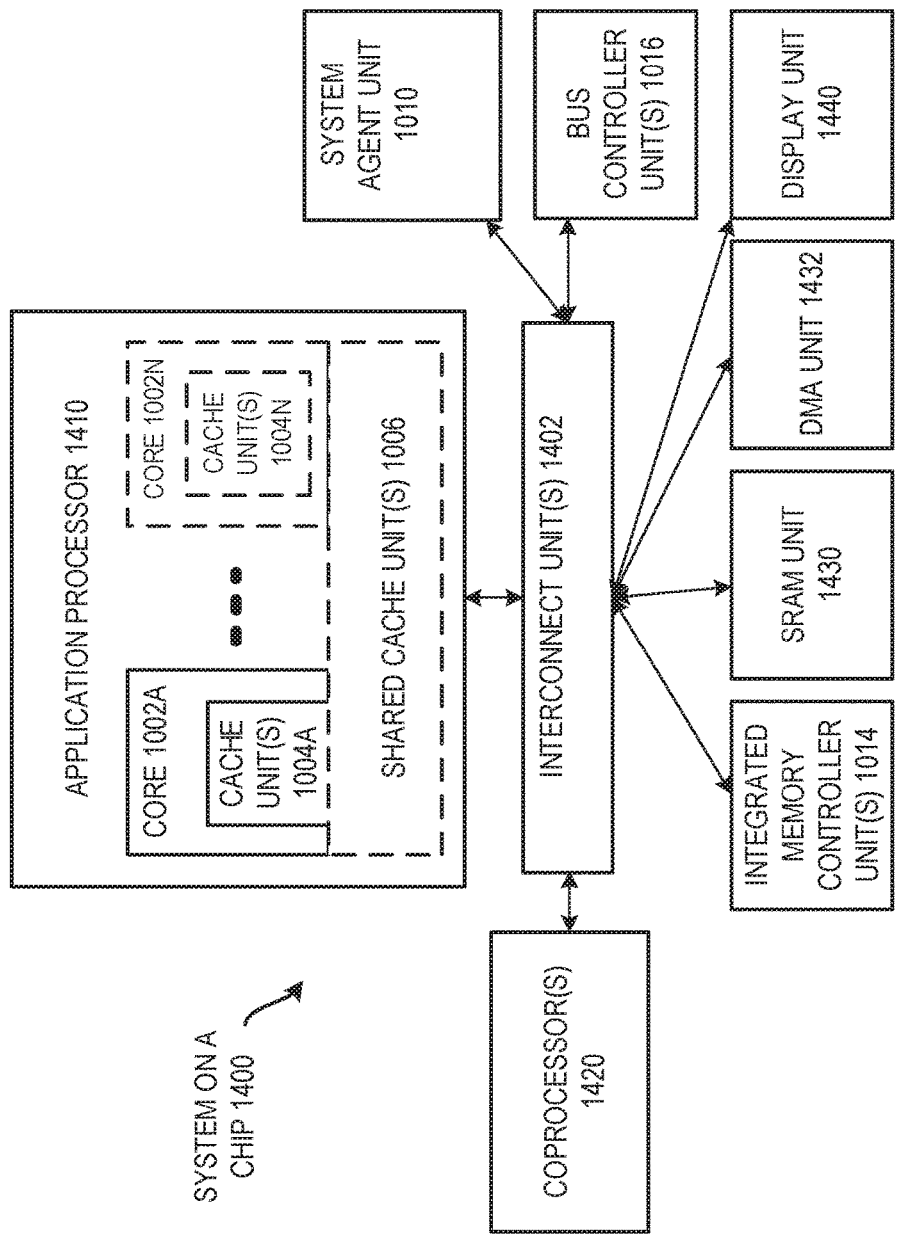
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
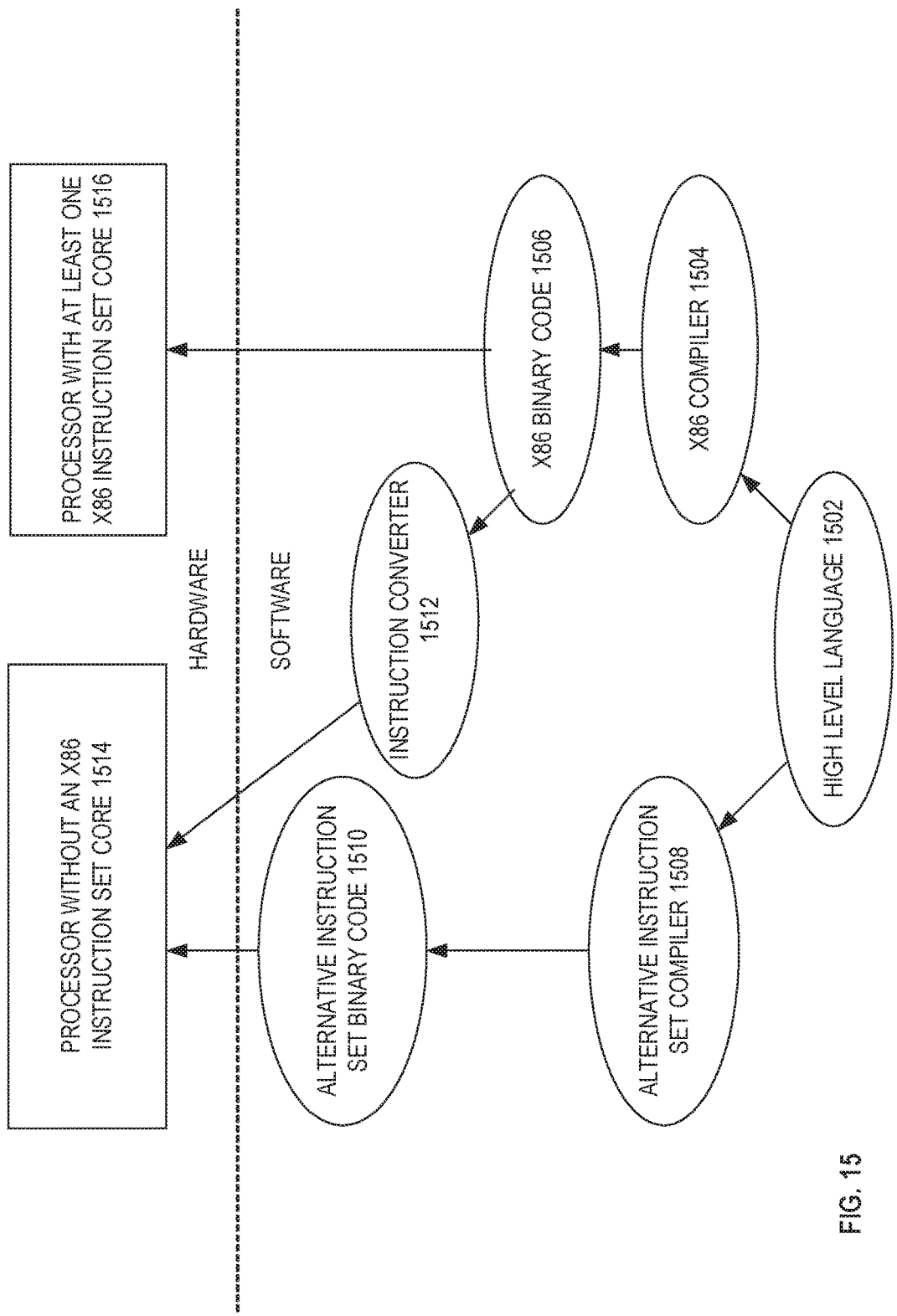
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein. Any of the instructions disclosed herein in embodiments may optionally be performed by and/or with any of the processors disclosed herein, optionally in some embodiments having any of the microarchitectures shown herein, and optionally in some embodiments included in any of the systems shown herein. Accordingly, features and details described for any of the instructions disclosed herein may in some embodiments therefore optionally apply to any of the processors and/or systems disclosed herein which may be used to perform those instructions.

Processor components disclosed herein may be said to be operative, configured, capable, or able to perform an operation. For example, a decoder may be to decode an instruction, an execution unit may be to store a result, etc. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example 1 is a processor including a decode unit to decode an instruction. The instruction to indicate a first structure in a protected container memory and to indicate a second structure in the protected container memory. The processor also includes an execution unit coupled with the decode unit. The execution unit, in response to the instruction, to (1) determine whether a status indicator is configured to allow at least one key to be exchanged between the first and second structures, and (2) exchange the at least one key between the first and second structures, when the status indicator is configured to allow the at least one key to be exchanged between the first and second structures.

Example 2 includes the processor of Example 1, in which the execution unit, in response to the instruction, is not to exchange the at least one key between the first and second structures when the status indicator is configured not to allow the at least one key to be exchanged between the first and second structures.

Example 3 includes the processor of Example 1, in which the decode unit is to decode the instruction that is to indicate a source protected container key repository structure as the first structure, and is to indicate a destination protected container key deployment structure as the second structure. Also, optionally in which the execution unit, in response to the instruction, is to store at least one key of the source protected container key repository structure into the destination protected container key deployment structure, when the status indicator is configured to allow the at least one key to be exchanged between the first and second structures.

Example 4 includes the processor of Example 3, in which the execution unit, in response to the instruction, is to store an authentication value into the destination protected container key deployment structure when the status indicator is configured to allow the at least one key to be exchanged between the first and second structures.

Example 5 includes the processor of Example 4, in which a trusted protected container is operative to produce the authentication value but privileged system software is not operative to produce the authentication value.

Example 6 includes the processor of any one of Examples 4 to 5, in which the execution unit, in response to the instruction, is to configure an operational status indicator to indicate that the destination protected container key deployment structure is operational when the at least one key of the source protected container key repository structure is to be stored into the destination protected container key deployment structure.

Example 7 includes the processor of Example 1, in which the decode unit is to decode the instruction that is to indicate a source protected container key deployment structure as the first structure, and is to indicate a destination protected container key repository structure as the second structure. Also, optionally in which the execution unit, in response to the instruction, is to store at least one key of the source protected container key deployment structure into the destination protected container key repository structure when the status indicator is configured to allow the at least one key to be exchanged between the first and second structures.

Example 8 includes the processor of Example 7, in which execution unit, in response to the instruction, is to determine whether an authentication value of the source protected container key deployment structure is compatible with an authentication value of the destination protected container key deployment structure. Also, optionally in which the execution unit is to store the at least one key of the source protected container key deployment structure into the destination protected container key repository structure only when the authentication values are compatible.

Example 9 includes the processor of Example 8, in which a trusted protected container is operative to produce the authentication value but privileged system software is not operative to produce the authentication value.

Example 10 includes the processor of any one of Examples 7 to 9, in which the execution unit, in response to the instruction, is to configure an operational status indicator to indicate that the source protected container key deployment structure is not operational when the at least one key of the source protected container key deployment structure is to be stored to the destination protected container key repository structure.

Example 11 includes the processor of any one of Examples 1 to 10, in which the execution unit, in response to the instruction, is to change the status indicator when the at least one key is to be exchanged between the first and second structures.

Example 12 includes the processor of any one of Examples 1 to 10, in which the status indicator is to be writable by a trusted protected container but is not to be writable by privileged system software.

Example 13 includes the processor of any one of Examples 1 to 10, in which the decode unit is to decode the instruction which is to indicate the first structure which is to be managed by, but not readable and not writable by, privileged system software, and to indicate the second structure which is to be managed by, and writable by, a trusted protected container.

Example 14 includes the processor of any one of Examples 1 to 10, in which the decode unit is to decode the instruction that is to indicate the first structure and the second structure which are to be different types of structures.

Example 15 includes the processor of any one of Examples 1 to 10, in which the decode unit is to decode the instruction that is to indicate the first structure and the second structure which are to be different types of protected container pages.

Example 16 includes the processor of Example 1, in which the decode unit is to decode the instruction which is to be a privileged instruction that cannot be performed at a user-level privilege.

Example 17 is a method performed by a processor including receiving an instruction. The instruction indicating a first structure in a protected container memory and indicating a second structure in the protected container memory. The method also includes, in response to the instruction, (1) determining whether a status indicator allows at least one key to be exchanged between the first and second structures, and (2) exchange the at least one key between the first and second structures when the status indicator allows the at least one key to be exchanged between the first and second structures.

Example 18 includes the method of Example 17, in which the receiving includes receiving the instruction that indicates a source protected container key repository structure as the first structure, and that indicates a destination protected container key deployment structure as the second structure. Also, optionally in which the exchanging includes storing at least one key of the source protected container key repository structure into the destination protected container key deployment structure when the status indicator allows the at least one key to be exchanged between the first and second structures.

Example 19 includes the method of Example 17, in which the receiving includes receiving the instruction that indicates a source protected container key deployment structure as the first structure, and that indicates a destination protected container key repository structure as the second structure. Also, optionally in which the exchanging includes storing at least one key of the source protected container key deployment structure into the destination protected container key repository structure when the status indicator allows the at least one key to be exchanged between the first and second structures.

Example 20 includes the method of Example 19, further including, in response to the instruction determining whether an authentication value of the source protected container key deployment structure is compatible with an authentication value of the destination protected container key deployment structure. Also, optionally storing the at least one key of the source protected container key deployment structure into the destination protected container key repository structure only when the determination is that the authentication values are compatible.

Example 21 includes the method of Example 17, further including, in response to the instruction, changing the status indicator when the at least one key is exchanged between the first and second structures.

Example 22 is a processor including a memory controller, and a core coupled with the memory controller. The core to determine whether a status indicator is configured to allow at least one key to be exchanged between a first structure in a protected container memory and a second structure in the protected container memory. The core also to exchange the at least one key between the first and second structures when the status indicator is configured to allow the at least one key to be exchanged between the first and second structures.

Example 23 includes the processor of Example 22, in which the status indicator is to be writable by a trusted protected container but is not to be writable by privileged system software.

Example 24 is a system to process instructions including an interconnect, and a processor coupled with the interconnect. The processor to receive an instruction that is to indicate a first structure in a protected container memory and is to indicate a second structure in the protected container memory. The processor, in response to the instruction, to determine whether a status indicator is configured to allow at least one key to be exchanged between the first and second structures. The processor also to exchange the at least one key between the first and second structures when the status indicator is configured to allow the at least one key to be exchanged between the first and second structures. The system also includes a dynamic random access memory (DRAM) coupled with the interconnect. The DRAM storing a set of instructions corresponding to a trusted protected container. The set of instructions, when executed by the processor, to cause the processor to perform operations including configure the status indicator to allow the at least one key to be exchanged between the first and second structures at a time when the trusted protected container intends to allow the at least one key to be migrated from the system to another system as part of a protected container migration.

Example 25 includes the system of Example 24, in which the status indicator is to be writable by the trusted protected container but is not to be writable by privileged system software.

What is claimed is:

1. A processor comprising:
   a die
   a decode unit on the die to decode an instruction of an instruction set of the processor, the instruction to indicate a first structure in a protected container memory and to indicate a second structure in the protected container memory;
   an execution unit on the die and coupled with the decode unit, the execution unit, in response to the instruction, to:
   determine whether a status indicator is configured to allow at least one key to be exchanged between the first and second structures; and
   exchange the at least one key between the first and second structures when the status indicator is configured to allow the at least one key to be exchanged between the first and second structures.

2. The processor of claim 1, wherein the execution unit, in response to the instruction, is not to exchange the at least one key between the first and second structures when the status indicator is configured not to allow the at least one key to be exchanged between the first and second structures.

3. The processor of claim 1, wherein the execution unit, in response to the instruction, is to change the status indicator when the at least one key is to be exchanged between the first and second structures.

4. The processor of claim 1, wherein the status indicator is to be writable by a trusted protected container but is not to be writable by privileged system software.

5. The processor of claim 1, wherein the decode unit is to decode the instruction which is to indicate the first structure which is to be managed by, but not readable and not writable by, privileged system software, and to indicate the second structure which is to be managed by, and writable by, a trusted protected container.

6. The processor of claim 1, wherein the decode unit is to decode the instruction that is to indicate the first structure and the second structure which are to be different types of structures.

7. The processor of claim 1, wherein the decode unit is to decode the instruction that is to indicate the first structure and the second structure which are to be different types of protected container pages.

8. The processor of claim 1, wherein the decode unit is to decode the instruction which is to be a privileged instruction that cannot be performed at a user-level privilege.

9. The processor of claim 1, wherein the decode unit is to decode the instruction that is to indicate a source protected container key repository structure as the first structure, and is to indicate a destination protected container key deployment structure as the second structure, and wherein the execution unit, in response to the instruction, is to store at least one key of the source protected container key repository structure into the destination protected container key deployment structure when the status indicator is configured to allow the at least one key to be exchanged between the first and second structures.

10. The processor of claim 9, wherein the execution unit, in response to the instruction, is to store an authentication value into the destination protected container key deployment structure when the status indicator is configured to allow the at least one key to be exchanged between the first and second structures.

11. The processor of claim 10, wherein a trusted protected container is operative to produce the authentication value but privileged system software is not operative to produce the authentication value.

12. The processor of claim 10, wherein the execution unit, in response to the instruction, is to configure an operational status indicator to indicate that the destination protected container key deployment structure is operational when the at least one key of the source protected container key repository structure is to be stored into the destination protected container key deployment structure.

13. The processor of claim 1, wherein the decode unit is to decode the instruction that is to indicate a source protected container key deployment structure as the first structure, and is to indicate a destination protected container key repository structure as the second structure, and wherein the execution unit, in response to the instruction, is to store at least one key of the source protected container key deployment structure into the destination protected container key repository structure when the status indicator is configured to allow the at least one key to be exchanged between the first and second structures.

14. The processor of claim 13, wherein execution unit, in response to the instruction, is to:
    determine whether an authentication value of the source protected container key deployment structure is compatible with an authentication value of the destination protected container key deployment structure; and
    store the at least one key of the source protected container key deployment structure into the destination protected container key repository structure only when the authentication values are compatible.

15. The processor of claim 14, wherein a trusted protected container is operative to produce the authentication value but privileged system software is not operative to produce the authentication value.

16. The processor of claim 13, wherein the execution unit, in response to the instruction, is to configure an operational status indicator to indicate that the source protected container key deployment structure is not operational when the at least one key of the source protected container key deployment structure is to be stored to the destination protected container key repository structure.

17. A method performed by a processor comprising:
  decoding an instruction of an instruction set of the processor with a decode unit that is on a die of the processor, the instruction indicating a first structure in a protected container memory and indicating a second structure in the protected container memory; and
  in response to the instruction:
  determining whether a status indicator allows at least one key to be exchanged between the first and second structures; and
  exchanging the at least one key between the first and second structures when the status indicator allows the at least one key to be exchanged between the first and second structures.

18. The method of claim 17, wherein said receiving comprises receiving the instruction that indicates a source protected container key repository structure as the first structure, and that indicates a destination protected container key deployment structure as the second structure, and wherein said exchanging comprises storing at least one key of the source protected container key repository structure into the destination protected container key deployment structure when the status indicator allows the at least one key to be exchanged between the first and second structures.

19. The method of claim 17, further comprising, in response to the instruction, changing the status indicator when the at least one key is exchanged between the first and second structures.

20. The method of claim 17, wherein said receiving comprises receiving the instruction that indicates a source protected container key deployment structure as the first structure, and that indicates a destination protected container key repository structure as the second structure, and wherein said exchanging comprises storing at least one key of the source protected container key deployment structure into the destination protected container key repository structure when the status indicator allows the at least one key to be exchanged between the first and second structures.

21. The method of claim 20, further comprising, in response to the instruction:
  determining whether an authentication value of the source protected container key deployment structure is compatible with an authentication value of the destination protected container key deployment structure; and
  storing the at least one key of the source protected container key deployment structure into the destination protected container key repository structure only when the determination is that the authentication values are compatible.

22. A processor comprising:
  a die;
  a memory controller on the die; and
  a core on the die and coupled with the memory controller, the core to:
  determine whether a status indicator is configured to allow at least one key to be exchanged between a first structure in a protected container memory and a second structure in the protected container memory; and
  exchange the at least one key between the first and second structures when the status indicator is configured to allow the at least one key to be exchanged between the first and second structures.

23. The processor of claim 22, wherein the status indicator is to be writable by a trusted protected container but is not to be writable by privileged system software.

24. A system to process instructions comprising:
  an interconnect;
  a processor coupled with the interconnect, the processor having a die and including a decode unit on the die to decode an instruction of an instruction set of the processor that is to indicate a first structure in a protected container memory and is to indicate a second structure in the protected container memory, the processor, in response to the instruction, to:
  determine whether a status indicator is configured to allow at least one key to be exchanged between the first and second structures; and
  exchange the at least one key between the first and second structures when the status indicator is configured to allow the at least one key to be exchanged between the first and second structures; and
  a dynamic random access memory (DRAM) coupled with the interconnect, the DRAM storing a set of instructions corresponding to a trusted protected container, the set of instructions, when executed by the processor, to cause the processor to perform operations comprising configure the status indicator to allow the at least one key to be exchanged between the first and second structures at a time when the trusted protected container intends to allow the at least one key to be migrated from the system to another system as part of a protected container migration.

25. The system of claim 24, wherein the status indicator is to be writable by the trusted protected container but is not to be writable by privileged system software.

* * * * *